(12) United States Patent
Lambert et al.

(10) Patent No.: US 9,159,079 B2
(45) Date of Patent: Oct. 13, 2015

(54) PRODUCT DISCOUNT SYSTEM, APPARATUS AND METHOD

(75) Inventors: Daniel Thomas Lambert, Boston, MA (US); Jason Daniel Gurwin, Livingston, NJ (US); Peter Michailidis, Columbus, OH (US)

(73) Assignee: Ebates Performance Marketing, Inc., San Francisco, CA (US)

(*) Notice: Subject to any disclaimer, the term of this patent is extended or adjusted under 35 U.S.C. 154(b) by 486 days.

(21) Appl. No.: 12/662,298

(22) Filed: Apr. 9, 2010

(65) Prior Publication Data

US 2011/0251879 A1    Oct. 13, 2011

(51) Int. Cl.
*G06Q 30/00*    (2012.01)
*G06Q 30/02*    (2012.01)

(52) U.S. Cl.
CPC ............ *G06Q 30/0207* (2013.01); *G06Q 30/02* (2013.01); *G06Q 30/0211* (2013.01); *G06Q 30/0224* (2013.01); *G06Q 30/0226* (2013.01); *G06Q 30/0238* (2013.01)

(58) Field of Classification Search
USPC ............................................ 705/14.13, 14.24
See application file for complete search history.

(56) References Cited

U.S. PATENT DOCUMENTS

| | | | |
|---|---|---|---|
| 4,910,672 A * | 3/1990 | Off et al. .................... | 705/14.13 |
| 5,250,789 A * | 10/1993 | Johnsen ...................... | 705/14.23 |
| 5,500,890 A * | 3/1996 | Rogge et al. ................ | 379/91.02 |
| 6,101,482 A | 8/2000 | DiAngelo et al. | |
| 6,341,353 B1 | 1/2002 | Herman et al. | |
| 6,571,279 B1 | 5/2003 | Herz et al. | |
| 6,725,222 B1 | 4/2004 | Musgrove et al. | |
| 7,512,548 B1 | 3/2009 | Bezos et al. | |
| 7,734,729 B2 | 6/2010 | Du et al. | |
| 2001/0032128 A1 | 10/2001 | Kepecs | |
| 2002/0038255 A1 | 3/2002 | Tarvydas et al. | |
| 2002/0095335 A1 | 7/2002 | Barnett et al. | |
| 2002/0117544 A1 * | 8/2002 | Wolf et al. ................... | 235/383 |
| 2003/0158844 A1 | 8/2003 | Kramer et al. | |
| 2004/0083134 A1 | 4/2004 | Spero et al. | |
| 2004/0254855 A1 | 12/2004 | Shah | |
| 2005/0131768 A1 | 6/2005 | Rodriguez et al. | |
| 2006/0242011 A1 | 10/2006 | Bell et al. | |
| 2006/0265281 A1 | 11/2006 | Sprovieri et al. | |
| 2007/0050258 A1 | 3/2007 | Dohse | |
| 2008/0103887 A1 | 5/2008 | Oldham et al. | |
| 2008/0154731 A1 * | 6/2008 | Mesaros ....................... | 705/14 |
| 2008/0319854 A1 | 12/2008 | Duroux et al. | |

(Continued)

OTHER PUBLICATIONS

Amazon, "Creating a Wish List", available Feb. 25, 2011, retrieved May 29, 2014, http://www.amazon.com/gp/help/customer/display.html?ie=UTF8&nodeId=501088.

*Primary Examiner* — John G Weiss
*Assistant Examiner* — Scott C Anderson
(74) *Attorney, Agent, or Firm* — Lessani Law Group, PC

(57) ABSTRACT

A product discount system, apparatus, and method are herein disclosed. A discount server may receive one or more product discounts from a use. A wireless device may retrieve product identification information from a product and generate a discount request message that is transmitted to a discount server. The discount server may identify potential discounts associated with the product identification information and transmit product availability data to the wireless device. The wireless device may notify a user of available product discounts based on the product availability data. Once notified, the user may proceed by redeeming one or more of the available product discounts.

14 Claims, 13 Drawing Sheets

(56) References Cited

U.S. PATENT DOCUMENTS

| | | |
|---|---|---|
| 2009/0024464 A1 | 1/2009 | Weiss et al. |
| 2009/0240588 A1* | 9/2009 | Turner et al. ............ 705/14 |
| 2010/0042515 A1 | 2/2010 | Crespo et al. |
| 2011/0106605 A1 | 5/2011 | Malik et al. |
| 2011/0167456 A1 | 7/2011 | Kokenos et al. |
| 2013/0030853 A1 | 1/2013 | Agarwal et al. |

* cited by examiner

PRODUCT DISCOUNT SYSTEM, APPARATUS AND METHOD

BACKGROUND

1. Related Field

The present invention generally relates to product discount solutions. More specifically, the present invention relates to systems, apparatuses and methods related to offering and redeeming product discounts.

2. Description of the Related Art

Offering and redeeming product discounts, such as coupons, is commonly practiced in many markets and economies throughout the world. While a single transaction involving a product discount may be or seem somewhat inconsequential, a large number of such transactions can lead to significant economic benefits such as an increase in market competition, enhanced economic efficiency, and greater consumer purchasing power and financial flexibility. Unfortunately, currently available solutions for offering and redeeming product discounts have significant limitations.

For instance, current solutions can be very inefficient in terms of the costs associated with designing and distributing product discounts and the number of discounts actually redeemed by consumers. In addition, popular discount distribution strategies are often quite costly because they typically call for a high-volume distribution approach. One reason for this stems from an inability to better focus distribution resources on appropriate venues, geographic locations, and consumers.

Further, currently available solutions often require consumers to perform tedious tasks in order to redeem a product discount. These tasks include finding desirable coupons, cutting them from newspapers, magazines, or computer printouts, searching store isles to match each coupon to the appropriate product, and having to be mindful of coupon expiration dates. These and other limitations prohibit individuals, companies, and other organization from obtaining a more significant portion of the economic benefits that can come from more efficient and effective product discount solutions.

SUMMARY

In one embodiment of the present invention, a method comprises retrieving product identification information from one or more products and generating a discount request message based on the product identification information. The method also comprises transmitting the discount request message to a discount server and receiving discount availability data from the discount server. The method further comprises notifying a user of at least one available discount based on the discount availability data.

In certain embodiments, the method further comprises detecting a discount acceptance event corresponding to the available discount and storing discount data corresponding to the discount acceptance event. In some embodiments, the method further comprises detecting a discount acceptance event corresponding to the available discounts and communicating discount data corresponding to the discount acceptance event to a point-of-sale device. In other embodiments, the method comprises detecting a discount acceptance event corresponding to the available discounts and initiating an association between the available discount and a customer loyalty device. Embodiments of the method may also comprise detecting a discount acceptance event corresponding to the available discounts, generating discount redemption data corresponding to the discount acceptance event, and transmitting the discount redemption data to the discount server.

In certain embodiments, the method further comprises generating user-driven competition data and transmitting the user-driven competition data to the discount server. In some embodiments, the method further comprises communicating discount data corresponding to the available discounts to a point-of-sale device, initiating a data reception confirmation interval, notifying the user of a data reception success when a data reception confirmation is received prior to expiration of the data reception confirmation interval, and notifying the user of a data reception failure when the data reception confirmation is not received prior to the expiration of the data confirmation interval. Embodiments of the invention may also include embodiments where the retrieving of the product identification information comprises activating a camera, a video camera, a barcode scanner, a radio frequency identification detector, a Bluetooth receiver, a light reflection detector, and/or a microphone. In certain embodiments, the generating of the discount request message is also based on user-specific information.

In another embodiment of the present invention, an apparatus comprises a processor configured to retrieve product identification information from a product, generate a discount request message based on the product identification information, transmit the discount request message to a discount server, receive discount availability data from the discount server, and notify a user of available discounts based on the discount availability data.

In certain embodiments, the processor is further configured to detect a discount acceptance event corresponding to the available discounts and store discount data corresponding to the discount acceptance event. In some embodiments, the processor is further configured to detect a discount acceptance event corresponding to the available discounts and communicate discount data corresponding to the discount acceptance event to a point-of-sale device. In one or more embodiments, the processor is further configured to detect a discount acceptance event corresponding to the available discounts and initiate an association between the available discounts and a customer loyalty device.

Embodiments of the apparatus may also include the processor being configured to detect a discount acceptance event corresponding to the available discount, generate discount redemption data corresponding to the discount acceptance event, and transmit the discount redemption data to the discount server. In some embodiments, the processor is further configured to generate user-driven competition data and transmit the user-driven competition data to the discount server.

In some embodiments, the processor is also configured to communicate discount data corresponding to an available discount to a point-of-sale device, initiate a data reception confirmation interval, notify the user of a data reception success when a data reception confirmation is received prior to expiration of the data reception confirmation interval, and notify the user of a data reception failure when the data reception confirmation is not received prior to expiration of the data confirmation interval. In one or more embodiments, the processor is configured to receive the product identification information by activating a camera, a video camera, a barcode scanner, a radio frequency identification detector, a Bluetooth receiver, a light reflection detector, and/or a microphone. In certain embodiments, the discount request message may comprise user-specific information.

In another embodiment of the present invention, a computer program is embodied on a computer-readable medium and configured to control a processor to perform operations. The operations may comprise retrieving product identification information from at least one product, generating a discount request message based on the product identification information, transmitting the discount request message to a discount server, receiving discount availability data from the discount server, and notifying a user of at least one available discount based on the discount availability data.

In yet another embodiment of the present invention, a method comprises receiving a discount request message from a wireless device, the discount request message comprising product identification information, identifying potential discounts based on the product identification information, generating discount availability data corresponding to the potential discounts, and transmitting the discount availability data to the wireless device. In certain embodiments, the identifying of the potential discounts comprises identifying product discounts directly associated with the product identification information. In some embodiments, the identifying of the potential discounts comprises identifying product discounts indirectly associated with the product identification information.

In one or more embodiments, the identifying of the potential discounts comprises identifying cross-promotional products of a product associated with the product identification information and identifying product discounts corresponding to the cross-promotional product. Embodiments of the method may also include the identifying of the potential discounts comprising identifying products related to a product associated with the product identification information and identifying product discounts corresponding to the products related to the product associated with the product identification information. In some embodiments, the discount request message further comprises user information corresponding to a user of the wireless device and the identifying of the at least one available discount is also based on the user-specific information. In certain embodiments, the method further comprises receiving discount redemption data from the wireless device and/or user-driven competition data from the wireless device.

In another embodiment of the present invention, an apparatus comprises a processor configured to receive a discount request message from a wireless device, the discount request message comprising product identification information, identify potential discounts based on the product identification information, generate discount availability data corresponding to the potential discounts, and transmit the discount availability data to the wireless device.

In certain embodiments, the potential discounts include product discounts directly associated with the product identification information. In some embodiments, the potential discounts include product discounts indirectly associated with the product identification information. In some embodiments, the potential discount includes a discount associated with a cross-promotional product of a product associated with the product identification information. In one or more embodiments, the potential discounts comprise discounts associated with products related to a product associated with the product identification information.

Embodiments of the apparatus may also include the discount request message further comprising user-specific information corresponding to a user of the wireless device and the processor being configured to identify the potential discount based on the product identification information and the user-specific information. In certain embodiments, the processor is further configured to receive discount redemption data and/or user-driven competition data from the wireless device.

In another embodiment of the present invention, a computer program is embodied on a computer-readable medium and configured to control a processor to perform operations. The operations may include receiving a discount request message from a wireless device, the discount request message comprising product identification information, identifying potential discounts based on the product identification information, generating discount availability data corresponding to the potential discounts, and transmitting the discount availability data to the wireless device.

In yet another embodiment of the present invention, a method comprises receiving product-related data from a user, defining a product discount based on the product-related data, associating the product discount with a discount constraint, and preparing the product discount for distribution. In certain embodiments, the method also includes associating the product discounts with additional product discounts products other a product of the previously defined discount.

In some embodiments, the method also includes estimating a potential customer base corresponding to the product discounts and the discount constraints. In one or more embodiments, the method includes generating an electronic invoice, receiving invoice payment information from a user, and validating the invoice payment information. In certain embodiments, the preparing of the product discount for distribution includes enabling the transmission of discount availability data, corresponding to the product discount, in response to receiving a discount request message from a wireless device. In some embodiments, the discount constraints include one or more geographic locations and/or demographic requirements.

In another embodiment of the present invention, an apparatus comprises a processor configured to receive product-related data from a user, define a product discount based on the product-related data, associate the product discount with one or more discount constraints, and prepare the product discount for distribution. In certain embodiments, the processor is also configured to associate the product discount with additional product discounts, where the additional product discounts correspond to products other the product of the defined discount. In some embodiments, the processor is also configured to estimate a potential customer base corresponding to the product discount and the discount constraint.

Embodiments of the apparatus also include the processor being configure to generate an electronic invoice, receive invoice payment information from a user, and validate the invoice payment information. In certain embodiments, the processor is configured to prepare the product discount for distribution by enabling the transmission of discount availability data, corresponding to the product discount, in response to receiving a discount request message from a wireless device. In some embodiments, the discount constraint includes one or more geographical locations, and/or demographic requirements.

In another embodiment of the present invention, a computer program is embodied on a computer-readable medium and configured to control a processor to perform operations. The operations may comprise receiving product-related data from a user, defining at least one product discount based on the product-related data, associating the product discount with one or more discount constraint, and preparing the product discount for distribution.

In yet another embodiment of the present invention, a system comprises a discount server and a wireless device. The wireless device may be configured to retrieve product identification information from a product, generate a discount request message based on the product identification information, and transmit the discount request message to the discount server. The discount server may be configured to receive the discount request message, identify a potential discount based on product identification information, generate discount availability data corresponding to potential discount, and transmit the discount availability data to the wireless device. The wireless device may also be configured to receive the discount availability data from the discount server and notify a user of the available discount based on the discount availability data.

BRIEF DESCRIPTION OF THE DRAWINGS

A more particular description of the present invention will be rendered by reference to the appended Figures. These Figures depict only some embodiments of the invention and are not limiting of its scope. Regarding the Figures.

DETAILED DESCRIPTION

The following description and accompanying Figures demonstrate that the present invention may be practiced or implemented in a variety of embodiments. The discussion of these embodiments amounts to a complete written description that enables those of ordinary skill in the art to make and use the invention. While many embodiments are expressly disclosed herein, it should be appreciated that the present invention is not limited to the specifically disclosed embodiments. Indeed, those skilled in the will appreciate that one or more devices, features, operations, processes, characteristics, and qualities of any number of the described embodiments may be organized, reorganized, configured and reconfigured to create an embodiment that is not specifically discussed herein but nevertheless falls well within the scope the present invention.

Reference to "certain embodiments", "some embodiments", "other embodiments", "may", "may be", "can be", or similar language means that a particular device, feature, structure, operation, or characteristic described in connection with an embodiment is included in at least one embodiment of the present invention. Thus, appearances of the phrases "certain embodiments", "some embodiments", "other embodiments", "may", "may be", "can be", or similar language do not necessarily all refer to the same embodiment or group of embodiments and the described feature, structure, operation, or characteristic may vary from one embodiment to another.

Figure 1:
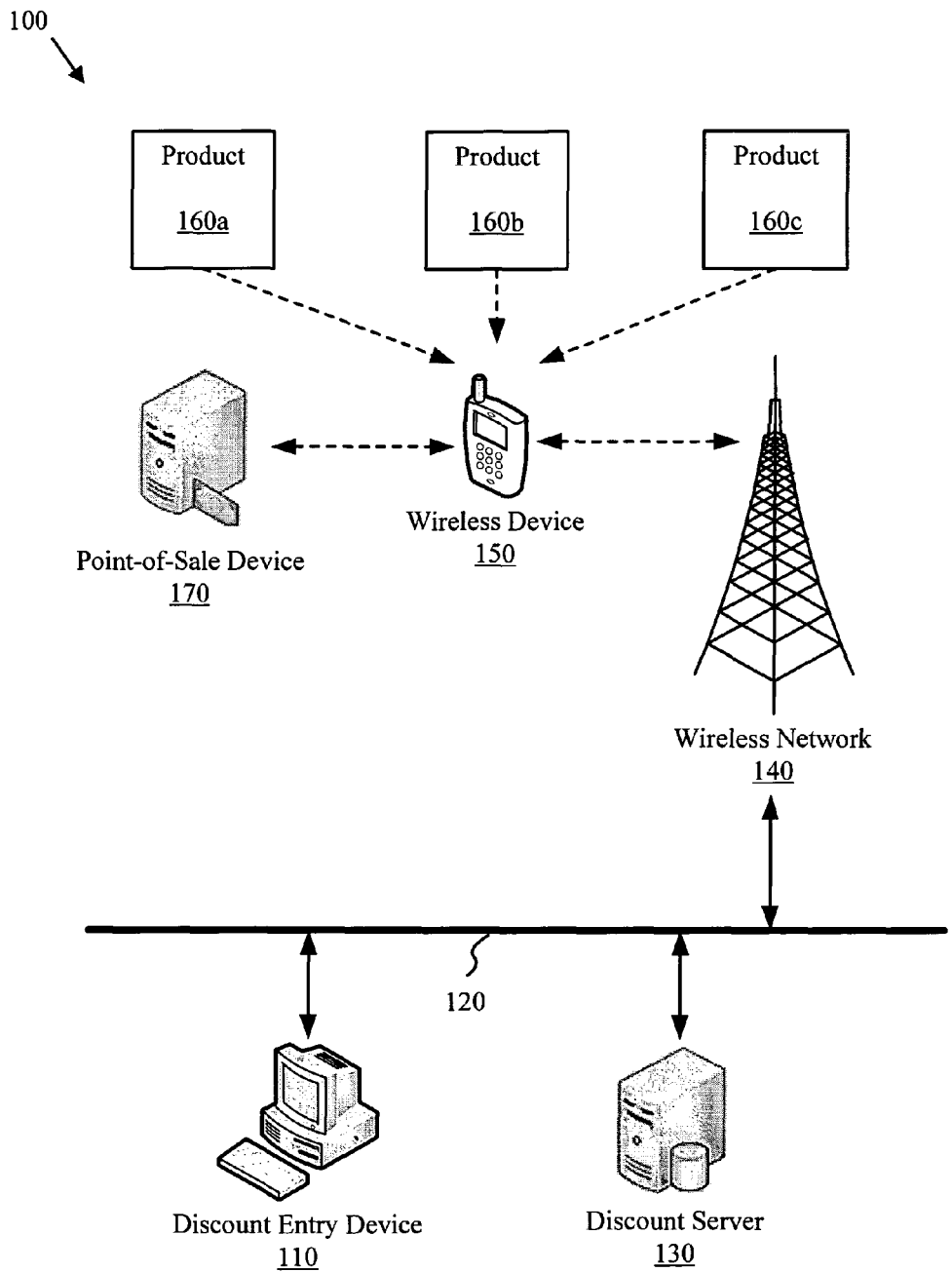
FIG. 1 is a system context diagram of a product discount system in accordance with one or more embodiments of the present invention.

FIG. 1 is a system context diagram of a product discount system 100 in accordance with one or more embodiments of the present invention. The depicted system 100 includes a discount entry device 110, a data service provider 120, a discount server 130, a wireless network 140, a wireless device 150, several products 160, and a point-of-sale device 170. As discussed below, the components and devices depicted in the system 100 may function cooperatively to provide an efficient and effective solution to offering and redeeming product discounts.

A company or other organization wanting to offer a product discount, such as a coupon, on one or more products 160 may input product-related data into the discount server 130. This may be done by entering the product-related data into the discount server 130 directly or remotely using a discount entry device 110 and data service provider 120. The discount server 130 and/or discount entry device 110 may also enable the company to modify the attributes and associations of a currently available discount or discontinue the discount all together.

A user wanting to determine whether one or more discounts are available for a particular product 160a or set of products 160, may use the wireless device 150 to retrieve product identification information from the product 160a or set of products 160. The wireless device 150 may then generate a discount request message based on the product identification information and transmit the discount request message to the discount server 130 via the wireless network 140 and data service provider 120. The discount server 130 may determine whether any discounts are available based on the product identification information and transmit discount availability data back to the wireless device 150, which may then notify the user of any available discounts and the discount information corresponding thereto.

The user may then redeem one or more of the available discounts in any number of ways. For instance, in some embodiments, the user may provide some or all of the discount availability data to a store clerk or manually enter some or all of the discount availability data into a point-of-sale device 170. In some embodiments, the wireless device 150 may initiate a print sequence so that a point-of-sale device printing mechanism or stand-alone printer produces a printed copy of the product discount. In some embodiments, the user may scan information from a graphical display of the wireless device 150 into the point-of-sale device 170 or directly transmit some or all of the discount availability data to the point-of-sale device 170 using any variety of wireless and/or physical connection. Once discount availability data has been received or a product discount has been registered, the point-of-sale device 170 may transmit a reception confirmation message to the wireless device 150. In certain embodiments, the wireless device may also generate and transmit discount redemption data and/or user-driven competition data to the discount server 130.

Figure 2:
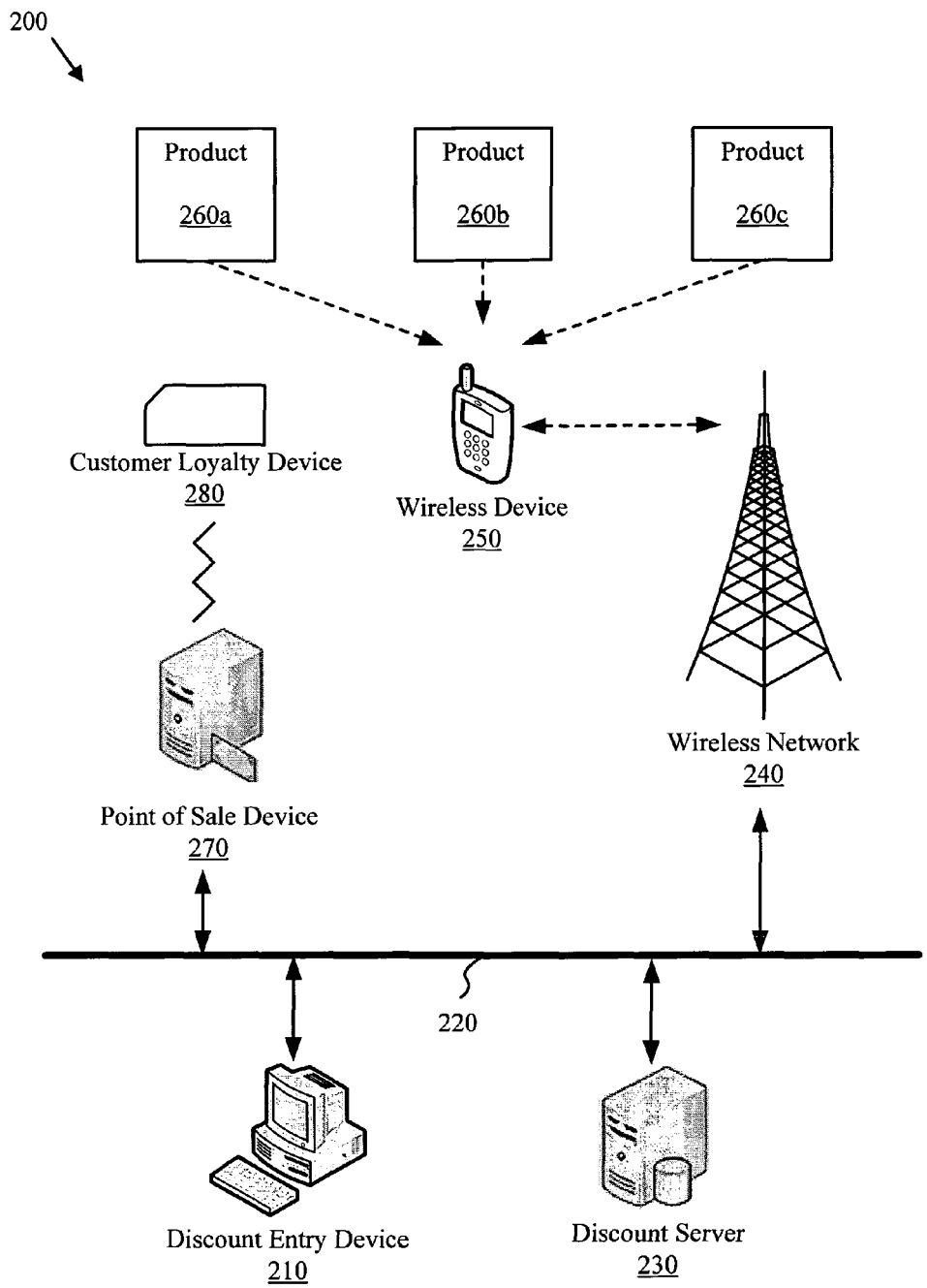
FIG. 2 is a system context diagram of another product discount system in accordance with one or more embodiments of the present invention.

FIG. 2 is a system context diagram of another product discount system 200 in accordance with one or more embodiments of the present invention. The depicted system 200 includes many of the devices discussed above with respect to FIG. 1, in addition to a customer loyalty device 280. As such, the attributes and operations of FIG. 1 may be applied in any suitable manner to FIG. 2. Similarly, the attributes and operations of FIG. 2 may be applied in any suitable manner to FIG. 1.

For instance, a company or organization may offer one or more product discounts by entering product-related data into the discount server 230 via the discount entry device 210 and the data service provider 220. In addition, a user may retrieve product identification information from one or more products 260 using the wireless device 250. The wireless device 250 may then use the discount identification information to generate a product discount request message and transmit the product discount request message to the discount server 230, which may respond by transmitting product availability data to the wireless device 250. The wireless devices 250 may then notify the user of available discounts based on the product availability data.

In the depicted system 200, however, a user may redeem a product discount in a manner not discussed in FIG. 1. Once the wireless device 250 has notified the user of available product discounts, the user may accept one or more of the product discounts, and the wireless device 250 may transmit product discount data through the wireless network 240 and data service provider 220 to the point-sale-device 270. In some embodiments, the wireless device 250 may transmit the product discount data to the discount server 230, and the discount server 230 may prepare and transmit discount information readable by the point-of-sale device 260. In any event, the point-of-sale device 270 may then register the discount to a customer loyalty device 280, such as a store membership card, wireless transmitter, or other device capable of passively or actively identifying a customer, which the user may use or otherwise rely upon during checkout to redeem the previously accepted product discounts.

It should be appreciated that the products, device, networks, and other features depicted in FIG. 1 and FIG. 2 may be embodied in many different ways. For instance, a discount entry device 110, 210 may include a desktop computer, a laptop computer, a wireless handheld device, or any other device or set of devices capable of performing the operations herein attributed to the discount entry device 110, 210. Similarly, examples of a discount server 130, 230 may include a simple stand alone server, a geographically centralized or distributed server system, or other device or set of devices capable of performing the operations herein attributed to the discount server 130, 230.

The point-of-sale device 170, 270 may include a cash register, a retail checkout device, a barcode scanner, a restaurant point of sale, a printer, an RFID detector, printing mechanism, a stand-alone printer, or similar device configured to facilitate the redemption of one or more product discounts. The data service provider 120, 220 may include an internet service provider or other data interchange capable of transmitting information to and from a server. The wireless network 130, 230 may be a mobile service provider, such as T-Mobile™, AT&T™, or Sprint™, and/or a short range network, such as a network that includes a wireless access point through a wireless router.

While the systems depicted in FIG. 1 and FIG. 2 accurately represent system-level embodiments of the present invention, those skilled in the art will appreciate that the present invention may be implemented using other system-level embodiments. For instance, in certain embodiments, the discount entry device 110, 210, the point-of-sale device 170, 270, and/or the discount server 130, 230 may be local to a retail location or remote. Similarly, the wireless network 140, 240 and data service provider 120, 220 may represent any combination of wide area network (WAN) or local area network (LAN) depending on the particular embodiment.

Figure 3:
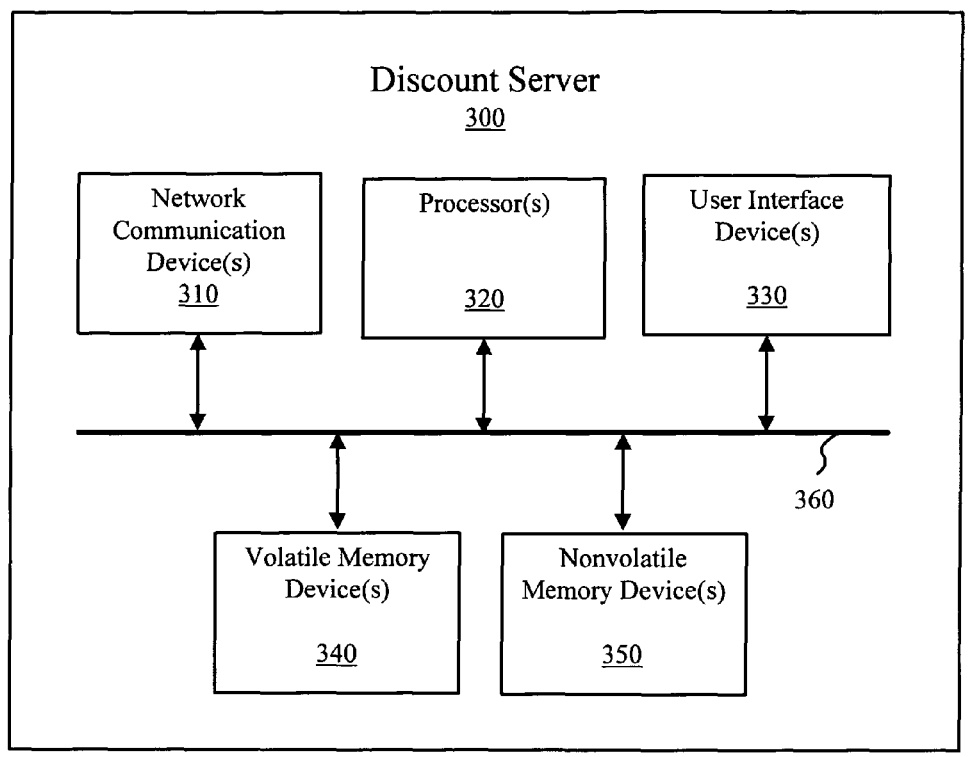
FIG. 3 is a block diagram of a discount server in accordance with one or more embodiments of the present invention.

FIG. 3 is a block diagram of a discount server 300 in accordance with one or more embodiments of the present invention. The depicted discount server 300 includes a network communication device 310, a processor 320, a user interface device 330, a volatile memory device 340, a non-volatile memory device 350, and one or more data channels 360. In certain embodiments, the depicted discount server 300 may correspond to the discount servers described above with respect to FIG. 1 and FIG. 2. The devices and device configurations of the discount server 300 may operate to enable an enhanced solution for offering a redeeming a product discount.

Many of the operations and/or configurations described below are directed to the processor 320 of the discount server 300. In addition to the examples and embodiments expressly discussed, it should be appreciated that such operations and/or configurations may be enabled, enhanced, facilitated, or embodied by the participation, cooperation, reliance, or assistance of other devices within the discount server 300. Further, such operations and/or configurations may be enabled, enhanced, facilitated, or embodied by the use, execution, or reliance on software and data stored in the volatile memory device 340 and/or the nonvolatile memory device 350. Further, it should be appreciated that alternative embodiments of the discount server 300 may lack one or more of the devices depicted in FIG. 3 or include one or more devices in addition to the device expressly depicted.

The processor 320 may be configured to receive product-related data from a user. In embodiments where the user submits data remotely, the processor 320 may be configured to communicate with the network device 310 to receive the product-related data. In embodiments or scenarios where the user submits the product-related data locally, the processor 320 may be configured to communicate with the user interface device 330. In certain embodiments, the product-related data may be received in response to the providing a graphical user interface to the user or otherwise prompting the user for the product-related data. In addition, the product-related data may be received by the processor 320 during a single data transfer session or over multiple data transfer sessions.

The processor 320 may also be configured to define product discounts based on the product-related data. In certain embodiments, the processor 320 may be configured to define a product discount by creating a unique discount ID and assigning one or more discount attributes to the unique discount ID. Examples of such discount attributes may include one or more product IDs, product titles, stock keeping units (SKUs), discount amounts or percentages, and/or discount durations.

The processor 320 may further be configured to associate product discounts with one or more discount constraints. A discount constraint may include a prerequisite or condition that must be satisfied before the discount can be made available or redeemed. For instance, a discount constraint may require a user to be located in one more geographic locations or require the user to be part of one or more demographically defined groups.

The processor 320 may also be configured to associate a product discount with additional product discounts. The associations created by the processor 320 may be direct association or indirect associations. Examples of a direct association may include an association that is created in response to an association request received from the user. Examples of an indirect association include associations that are created despite the absence of a request from the user to do so. For instance, the processor 320 may indirectly associate the product discount submitted by the user with the product discount of a competing product because the two products share the same or similar product categories and geographical constraints.

The processor 320 may further be configured to estimate a potential customer base corresponding to the product discount previously defined. A potential customer base may include a number of customers that are sufficiently likely to request and/or redeem the product discount in question. In certain embodiments, the processor 320 may be configured estimate the potential customer base upon the product-related data, the product discount previously defined, and/or the associated discount constraints. In some embodiments, the processor 320 may also be configured estimate the potential customer base after considering relevant historical data such as product discount requests and discount redemption data relating to similar products and/or discount constraints.

The processor 320 may further be configured to generate an electronic invoice, receive invoice payment information from the user, and validate the invoice payment information. In certain embodiments, the processor 320 may be configured to generate an electronic interface in a web browser that may present the user with the electronic invoice and/or prompt the user for the invoice payment information. In addition, the processor 320 may be configured to consider or factor in a variety of information when generating the electronic invoice and the amount due. For instance, the processor 320 may be configured to generate the electronic invoice based on previously submitted user identification information, previous payment information, and/or the size of the estimated customer base. Additionally, the processor 320 may be configured to validate the invoice payment information by a variety of electronic payment validation operations, including those known in the relevant art.

The processor 320 may also be configured to prepare a product discount for distribution. In certain embodiments, the processor 320 may be configured to do so by enabling the transmission of discount availability data, corresponding to the product discount, in response to receiving a discount request message from a wireless device. For instance, the processor 320 may create a database record for the product discount that may subsequently be accessed to generate and transmit product availability data to a wireless device.

Each of the devices of the discount server 300 may be embodied by a variety of different devices or combination of devices. For instance, the network communication device 310 may any include devices known to those skilled in the art to enable communication between one or more network devices. As such, examples of the network device 310 may include one or more network cards, wireless network cards, antennas; transmitters, receivers, or transceivers capable of enabling the discount server 300 and/or processor 310 to effectively communicate within a local area network (LAN), a wide area network (WAN), a wireless local area network (WLAN), and/or a wireless wide area network (WWAN).

Similarly, the processor 320 may include a variety of devices known to those skilled in the art to facilitate or enable the execution or performance of software instructions. For instance, the processor 320 may be embodied as one or more integrated circuit devices, central processing units (CPUs), microprocessors, or the like. In certain embodiments, the processor 320 may also include memory devices (i.e., a processor cache), time keeping devices (i.e., a real-time clock (RTC)), and/or additional circuitry or data transmission channels.

Also, the user interface device 330 may include any device or set of devices known in the art to enable a user to enter data into a computing device. As such, examples of a user interface device may include, but are not limited to, pressable buttons, key pads, key boards, scanners, microphones, cameras, video cameras, monitors, touch-sensitive display devices, and/or a mouse.

The volatile memory device 450 may include any type or combination of temporary memory or power-dependent storage devices, including dynamic random access memory (DRAM) and static random access memory (SRAM). The nonvolatile memory device 460 may include any type or combination of devices capable of storing data without a constant power source, including programmable read-only memory (PROM), erasable programmable read-only memory (EPROM), and electrically erasable programmable read-only memory (EEPROM).

In some embodiments, the processor 320 may be configured to receive a discount request message, including product identification information and user-specific information, from a wireless device. In certain embodiments, the processor 320 may be configured to receive the discount request message directly from the network communication device 310. The processor 320 may also be configured to receive the discount request message from the volatile memory device 340 if the discount request message received by the network communication device 310 is first stored in the volatile memory device 340.

The processor 320 may also be configured to identify one or more potential discounts based on the product identification information contained in the discount request message. The potential discounts may include a variety of discounts relating to the same product or relating to several different products. The processor 320 may be configured to access one or more product databases stored in the nonvolatile memory device 350, which may be enhanced by the processor 320 relying on the memory capacity of the volatile memory 350. The nonvolatile memory 360 may include a variety of database types, including MySQL, MSSQL, Oracle, and open database connectivity (ODBC).

The processor 320 may further be configured to generate discount availability data corresponding to the one or more available discounts. In certain embodiments, the processor 320 may be configured to do this by communicating with the volatile memory device 340 and/or nonvolatile memory device 350 to access user preferences, format information, protocol information, or other information relating to transmitting the discount availability data to the wireless device. Upon generating the discount availability data, the processor 320 may then transmit the discount availability to the wireless device via the network communication device 310.

In certain embodiments, the processor 320 may be configured to receive discount redemption data and/or user-driven competition data from a wireless device. Similar to receiving other messages or data, the processor 320 may receive the discount redemption data and/or user-driven competition data directly from the network communication device 310 or another discount server device such as the volatile memory device 340. In certain embodiments, the processor 320 may communicate with the volatile memory device 340 and/or nonvolatile memory device 350 to determine the nature of the discount redemption data and/or user-driven competition data and update or modify one or more database records accordingly. Further, the processor 320 may be configured to transmit, through the network communication device 310, user account information to the wireless device, so the wireless device user may confirm that the data has been received successful or to notify the user of the way in which the database records have been updated.

Figure 4:
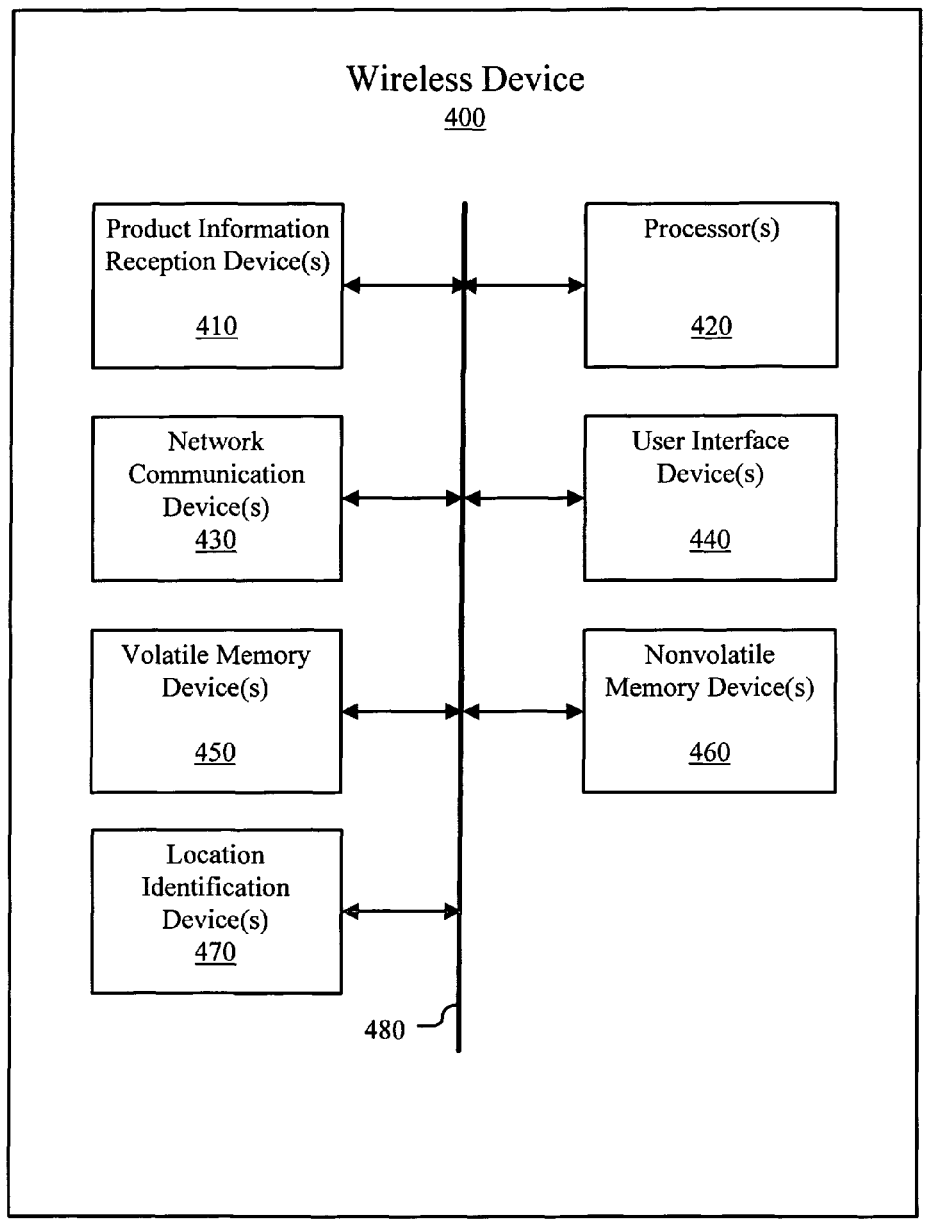
FIG. 4 is a block diagram of a wireless device in accordance with one or more embodiments of the present invention.

FIG. 4 is a block diagram of a wireless device 400 in accordance with one or more embodiments of the present invention. The depicted wireless device 400 comprises a product information reception device 410, a processor 420, a network communication device 430, a user interface device 440, a volatile memory device 450, a nonvolatile memory device 460, a location identification device 470, and one or more data transmission channels 480. In certain embodiments, the wireless device 400 may correspond to the wireless devices of FIG. 1 and FIG. 2. The components of the wireless device 400 may cooperatively operate to enable a user to discover and redeem product discounts without requiring any tedious or undesirable tasks.

The processor 420 may be configured to receive product identification information corresponding to one or more products. Similar to the processor of FIG. 3, the processor 420 may be embodied by a variety of devices known to those skilled in the art for executing, performing, or carrying out software instructions. For instance, the processor 420 may be embodied as any variety or combination of integrated circuit devices, CPUs, microprocessors, or other devices known in the art for executing logical instructions stored as software.

In certain embodiments, the processor 420 is configured to communicate with one or more of the wireless device components to execute this operation. For instance, the processor 320 may be configured to receive or detect a user-generated request, via the user interface device, to retrieve the product identification information. In response to such a request, the processor 420 may be configured to prompt or activate the product information reception device 410 to begin retrieving or receiving product information. Additionally the processor 420 may or may not be configured to actively assist the product information reception device 410 in initially obtaining the product identification information.

The user interface device 440 may be a single device or collection of devices, including a graphical interface, a touch-sensitive screen, a button, an array of buttons, a key pad, a key board, a microphone, a speaker, a motion detection device, one or more lights, a camera, and/or a video camera. Similarly, the product information reception device 410 may include any one of a variety of devices or combination of device. For instance, the product information reception device 410 may include a camera, a video camera, a microphone, a light reflection detector, a pen or wand-type reader, a laser scanner, an infrared scanner, a semi-automatic hand-held reader, a charge-coupled device (CCD) reader, reader gates, or other light or image capturing device. In some embodiments, the product information reception device 310 may also, or alternatively, include an RFID detector, a Bluetooth receiver, audio recorder, a wireless transceiver, a key pad, and/or other mechanism capable of retrieving or receiving product identification information.

The processor 420 may also be configured to generate a product discount request message based on the product identification information. In certain embodiments, the product discount request message may include user-specific information such as a user ID, a wireless device ID, an account number, user preferences, user geographical location, user demographic information, and/or any additional information relevant to identifying a product, identifying potential discounts, and generating product availability data. In certain embodiments, the processor 420 may be configured to communicate with the volatile memory device 450, the nonvolatile memory device, and/or the location identification device 470 to retrieve or otherwise obtain the information included in the discount request message.

The volatile memory device 450 may include any type or combination of temporary memory or power-dependent storage devices, including DRAM and SRAM. The nonvolatile memory device 460 may include any type or combination of devices capable of storing data without a constant power source, including PROM, EPROM, and EEPROM. The location identification device 470 may include any device or set of devices capable of ascertaining the geographical location of the wireless device 400 such as, but not limited to, a global positioning system (GPS) device, a cellular network positioning device, or the like. In certain embodiments, the location identification device 470 may be configured to detect a wireless signal strength, such as a local wireless signal strength, in order to ascertain a more precise location of the wireless device 400, including an aisle or other location within a store.

The processor 420 may further be configured to transmit the discount request message to a discount server and receive discount availability data in response thereto. In certain embodiments, the processor 420 is configured to transmit and receive this information by communicating with the network communication device 430, which may include one or more wireless transceivers capable of communicating with a WLAN and/or WWAN. Further, the processor 420 may be configured to transmit and receive this or other information in a single communication event or over distinct communication events.

The processor 420 may also be configured to notify a user of one or more available discounts. In certain embodiments, the processor 420 may cooperate with the user interface device 440 and volatile memory device 440 to notify the user. For instance, the processor 420 may temporarily store the discount availability data in the volatile memory device 450 and prompt or cause the user interface device 440 to graphically represent the available discounts, through which the user may browse.

The processor 420 may also cooperate with the user interface device 440 to enable the user accept or reject one or more of the available discounts. For instance, the processor 420 may cause the user interface device 440 to display one or more acceptance buttons on a touch-sensitive screen. Alternatively, the processor 420 may enable a user to accept available discounts by an audible command detected by a microphone or the pressing of one or more buttons on key pad.

In certain embodiments, the processor 420 is configured to detect a discount acceptance event corresponding to one or more of the available discounts. In certain embodiments, the processor 420 may also be configured to detect a discount rejection event when a user rejects or declines an available discount. In response to a discount acceptance event, the processor 420 may be configured to record or store discount data in the volatile memory device 450 and/or nonvolatile memory device 460.

The processor 420 may also communicate discount data corresponding to a discount acceptance event to a point-of-sale device. To do so, the processor 420 may be required to communicate with the volatile memory device 450 and/or the nonvolatile memory device. For instance, if the discount data was previously stored, the processor 420 may be required to access the nonvolatile memory device 460; however, if the discount data was not previously stored, the processor 420 may only be required to access the volatile memory device 450. In some embodiments or scenarios, the processor 420 may only need to access a cache memory (not shown) of the processor itself.

The processor 420 may communicate with the network communication device 430 to transmit the discount data to the point-of-sale device. Depending on the embodiment, the processor 420 may be configured to communicate the discount data directly or indirectly to the point-of-sale device. For instance, the discount data may be displayed by the user interface device 440 as an alphanumeric code that is manually entered into the point-of-sale device. The processor 420 may also cause the discount data to be displayed by the user interface device 440 as a barcode that can be scanned into the point-of-sale device. If the point-of-sale device is a stand-alone printer, the processor 420 may cause the stand-alone printer to produce a printed copy of the available discount, which the user may redeem upon checkout.

If the processor 420 and network communication device 430 are able to establish a direct connection, either physical or wireless, with the point-of-sale device, then the processor 420 may transmit the discount data directly to the point-of-sale device. Further, the processor 420 may be configured to communicate the discount data to the point-of-sale device by first communicating the discount data to the discount server. In such embodiments, the discount server may then communicate the discount data to the point-of-sale device after first converting the data to a form that is readable by the point-of-sale device.

In certain embodiments, this may cause the point-of-sale device to register or associate a credit or discount to a customer loyalty device such as a store membership card. In some embodiments, if the discount data is received during checkout the point-of-sale device may instantly redeem the discount by reducing an amount owed by the user. In certain embodiments, this may cause the point-of-sale device to register or associate a credit to a customer loyalty device such as a store membership card. In some embodiments, if the discount data is received during checkout the point-of-sale device may instantly redeem the discount by reducing an amount owed by the user. In certain embodiments, the processor 420 may be configured to determine an appropriate mode of communication before communicating the discount data.

The processor 420 may also be configured to generate discount redemption data in response to detecting a discount acceptance event. In certain embodiments, the processor 420 may be further configured to store the discount redemption information in the nonvolatile memory device 460 and/or transmit the discount redemption data to the discount server. In certain embodiments, the processor 420 may be configured to communicate with the network communication device 430, the volatile memory device 450, and/or the nonvolatile memory device 460, in order to obtain the requisite data to generate and transmit the discount redemption data.

The processor 420 may also be configured to generate user-driven competition data and transmit the user-driven competition data to a discount server. The processor 420 may also be configured to locally store the user-driven competition in the nonvolatile memory device 460. Similar to the discount redemption data discussed above, in certain embodiments, the processor 420 may be configured to communicate with or rely upon the network communication device 430, the volatile memory device 450, and/or the nonvolatile memory device 460 to generate and transmit the discount redemption data.

The processor 420 may be configured to manage operations according to a specified schedule. In certain embodiments, the processor 420 may manage the operations according to a time keeping device such as a real-time clock (RTC), which may be incorporated within the processor 420 or an individual device. In certain embodiments, the processor 420 may periodically determine the geographical location of the wireless device 400 and/or check for product discounts in the area, which may require the processor to communicate with other wireless device components such as the product information reception device 410 and the network communication device 430. In certain embodiments, the processor 420 may be configured initiate one or more operations in the background of the operating system so they are unbeknownst to the user.

Similar to the processor of FIG. 3, many of the operations and/or configurations described herein are directed to the processor 420 of the wireless device 400. In addition to the examples and embodiments expressly discussed, it should be appreciated that such operations and/or configurations may be enabled, enhanced, facilitated, or embodied by the participation, cooperation, reliance, or assistance of other devices within the discount server 300. Further, such operations and/or configurations may be enabled, enhanced, facilitated, or embodied by the use, execution, or reliance on software and data stored, installed or otherwise available. Further, additional embodiments of the wireless device 400 may lack one or more of the devices depicted in FIG. 4 or include one or more devices in addition to the device expressly depicted.

Embodiments of the present invention include a computer program stored or otherwise embodied on a computer-readable medium, the computer programs being configured to control a processor to perform one or more operations. A compute-readable medium storing, embodying, or encoded with a computer program, or similar language, may be embodied as a tangible data storage device storing one or more software programs that are configured to control a processor to perform one or more operations. A tangible data storage device may be embodied as one or more volatile memory devices, one or more nonvolatile memory devices, and/or a combination of one or more volatile memory devices and nonvolatile memory devices.

The flow chart diagrams that follow are generally set forth as logical flow chart diagram. The depicted order and labeled steps are indicative of at least one embodiment of the presented invention. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the method. Although various arrow types and line types may be employed in the flow chart diagrams, they are understood not to limit the scope of the corresponding method. Indeed, some arrows or other connectors may be used to indicate only the logical flow of the methods. For instance, an arrow may indicate a waiting or monitoring period of unspecified duration between enumerated steps or operations of the depicted method. Additionally, the order in which a particular method occurs may or may not strictly adhere to the order of the corresponding steps shown.

Figure 5:
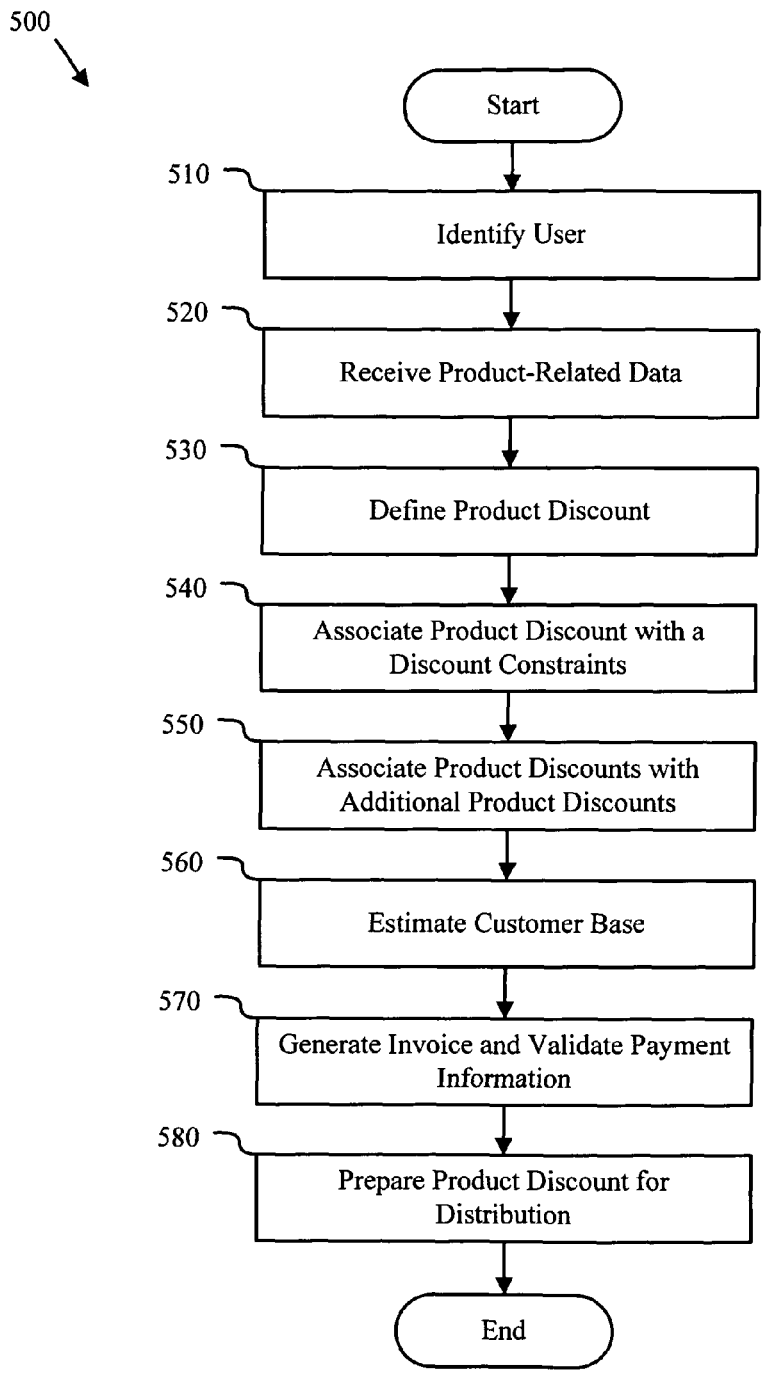
FIG. 5 is a flow chart diagram of a discount entry method in accordance with one or more embodiments of the present invention.

FIG. 5 is a flow chart diagram of a discount entry method 500 in accordance with one or more embodiments of the present invention. The depicted method 500 includes identifying 510 a user, receiving 520 product-related data, defining 530 a product discount, associating 540 the product discount with a discount constraint, associating 550 the product discount with additional product discounts, estimating 560 a potential customer base, generating 570 an invoice and validating payment information, and preparing 580 a product discount for distribution. In certain embodiments, one or more of the operations of the method 500 may be performed or otherwise executed by the discount server of FIG. 1 and FIG. 2 or the discount server devices of FIG. 3.

Identifying 510 a user may comprise a discount server locally or remotely providing a user-interface that prompts a user for identification and authentication information. Identifying 510 a user may also include executing one or more identification, authentication, or security-oriented operations based on the identification and authentication information submitted by the user. Such information may include information that is actively or passively submitted by the user, including a user ID, a password, one or more public or private security keys, and more. In embodiments involving a remote user, identifying 510 the user may also include establishing one or more secure connections between a discount server and a discount entry device. Accordingly, the method 500 can provide a secure and reliable environment in which user and sellers may begin creating and later distributing product discounts.

Similar to identifying 510 a user, receiving 520 product-related data from a user may comprise locally or remotely providing a user-interface that prompts the user for product-related data. Examples of product-related data may include, but are not limited to, a product category, a product sub-category, a product ID, a product title, a seller ID, a discount ID, a discount amount, a discount percentage, a discount duration, a product SKU, one or more geographic constraints, and one or more demographic constraints. The product-related data may also include an exclusivity request, which may comprise a request to exclude some or all other product discounts when offering the product discount to a consumer. As such, the method 500 can provide sellers with a convenient and user-friendly way to enter all the information that will be required to create and define product discount and make the discount available to target consumers.

Defining 530 a product discount may include assigning a unique discount ID to the product discount and directly associating the discount ID with one or more attributes and database objects. For instance, defining 530 a product discount may include directly associating a discount ID with a seller ID, a product category and sub-category (i.e., "Cereals" and "Frosted Flakes"), a product discount amount or percentage, a product discount duration, and/or a product ID. In certain embodiments, the discount ID may be associated with multiple discount amounts or percentages, multiple durations, and/or multiple products. Defining 530 a product discount may be at least partially based on the product-related data received from the user and may also include one or more automated operations such as generating and assigning a unique discount ID to the product discount and created a database record that maps the attributes and database objects associated to the discount ID.

Associating 540 a product discount with a discount constraint may comprise identifying one or more conditions that must be satisfied before the product discount will be made available to a consumer. Such requirements may include, but are not limited to, one or more geographic locations and/or one or more demographics. For example, associating 540 a product discount with a discount constraint may comprise relating a discount ID to a particular geographical location of a store that often carries the corresponding product and is willing to honor the product discount. Another example includes relating a discount ID to a target demographic that is unlikely to purchase the corresponding product unless a product discount is made available. In certain embodiments, the actual discount value or percentage may vary depending on one or more factors or conditions, including one or more discount constraints. As such, the method 500 provides a product distribution solution that enables sellers to have significant control over who may use a discount, where it can be used and when it can be used.

Associating 550 the product discount with additional product discounts may comprise relating the product discount to product discounts already available to consumers. The additional product discounts may correspond to the same product as the product discount being submitted or different products such as indirectly related products or cross-promotional products. Examples of indirectly related products may include products from the same seller as the product discount being submitted, products from a different seller, and competing products. In certain embodiments, whether the product discount is associated with additional product discounts, and which additional product discounts are associated thereto, depends on whether the user or seller has requested product discount, exclusivity.

Estimating 560 a potential customer base may comprise identifying the number of consumers that are likely to use the product discount being offered. In certain embodiments, estimating 560 the potential customer base may comprise determining a total number of potential consumers based on discount redemption data, historical usage, and/or user-driven competition data for similar product discounts, and reducing the total number of potential consumers based on the market conditions associated with the product discount being offered. Estimating 560 a potential customer base may provide a variety of benefits such as better informing a seller about the potential popularity of a discount, the effect that the specified market conditions have on the discount's popularity, and the impact that the discount may have on sales.

Generating 570 an invoice and validating payment information may comprise providing a user or seller with an electronic invoice and receiving invoice payment information from the seller. In certain embodiments, the generated invoice may be presented to a user via a user interface that also enables the seller to submit invoice payment information. The invoice amount may be based on a variety of factors, including the potential customer base previously estimated, and validating payment information may include any of the payment validation solutions known to those skilled in the art.

Preparing 580 the product discount for distribution may comprise a discount server executing one or more operations to enable the distribution of the product discount to consumers. In certain embodiments, preparing 580 the product discount for distribution includes enabling the transmission of discount availability data, corresponding to the product discount, in response to receiving a discount request message from a wireless device. Preparing 580 the product discount for distribution may also or alternatively include updating a distribution status associated with a product discount ID to indicate the product discount's availability.

Accordingly, the operations of the method 500 may enable an effective and efficient solution for sellers to use when creating product discounts and making the product discounts available to consumers.

Figure 6A:
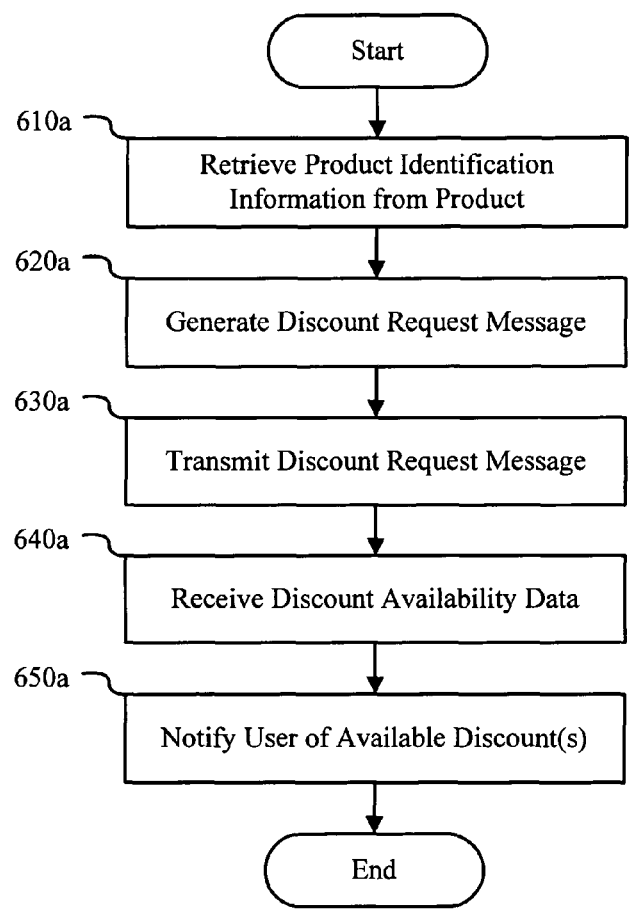
FIG. 6a is a flow chart diagram of a discount retrieval and redemption method in accordance with one or more embodiments of the present invention.

FIG. 6*a* is a flow chart diagram of a discount retrieval and redemption method 600*a* in accordance with one or more embodiments of the present invention. The depicted method 600*a* includes retrieving 610*a* product identification information from a product, generating 620*a* a discount request message, transmitting 630*a* the discount request message, receiving 630*a* discount availability data, and notifying 650*a* a user of available discounts. In certain embodiments, one or more of the operations of the method 600*a* may be performed, executed or otherwise correspond to the wireless device of FIG. 1 and FIG. 2 or one or more of the devices of wireless device of FIG. 4.

Retrieving 610a product identification information may comprise a variety of information acquisition operations, including simultaneously retrieving product identification information for multiple items. For instance, retrieving 610a product identification information may comprise activating a video camera to continually or periodically scan and search for data resembling a barcode, image of a product, image of a product title, or the like. In certain embodiments, retrieving 610a product identification information may comprise taking a "still frame" shot of one or more products with a camera and analyzing the resulting information for product labels and other product identification information.

In some embodiments, retrieving 610a product identification information may comprise detecting an audio signal from a user (i.e., speech) and extracting product identification information from the audio signal. In certain embodiments, retrieving 610a product identification information may comprise scanning a barcode with a CCD reader to obtain barcode information. Retrieving 610a product identification information may also, or alternatively, include receiving a typed word or message from a user that comprises product identification information.

Generating 620a a discount request message may comprise producing a message that is readable by a discount server and includes product identification information. Product identification information may include any type or amount of information necessary to identify a product. Examples of product identification information include, but are not limited to, information corresponding to a barcode, a multi-dimensional barcode, a product label, a product title, an alphanumeric code, an image of the product, and an SKU. Generating 620a a discount request message may also include producing a message that includes user-specific information such as a user ID, user preferences, a current geographic location, user demographic information, and more.

Transmitting 630a the discount request message may comprise communicating a request to a discount server for available discounts corresponding to the product identification information. In certain embodiments, the transmitting 630a may comprise performing one or more security-related or authenticity-related operations. Such operation may include providing a discount server with a user ID and password, providing the discount server with one or more security keys, or establishing a secure connection. Generating 620a a discount request message may also include producing a message that includes user-driven competition data such as a user ID, a time and date, user preferences, a current geographic location, and user demographic information.

Receiving 640a discount availability data may comprise receiving data representing one or more product discounts from a discount server. The discount availability data may be any information helpful or required to accurately describe an available product discount and associated product. For instance, the discount availability data may include one or more product discount IDs, product IDs, barcodes, SKUs, product titles, product images, discount amounts, geographic location data, discount duration information, and more.

Notifying 650a the user of the available discounts may include notifying 650 a user of one or more available discounts based on discount availability data received from a discount server. Notifying 650a the user may also include any one of, or any combination of, graphically representing the available discounts, illuminating a light, activating a vibration device, or producing one or more sounds. Upon being notified of available discounts, the user may proceed to redeem the available discounts in a variety of ways. For example, the user could manually type a product ID, SKU, product discount ID, or other discount availability data into a point-of-sale device. Alternatively, the user could present such information to a store clerk or checkout person capable of crediting the user with the product discount.

Figure 6B:
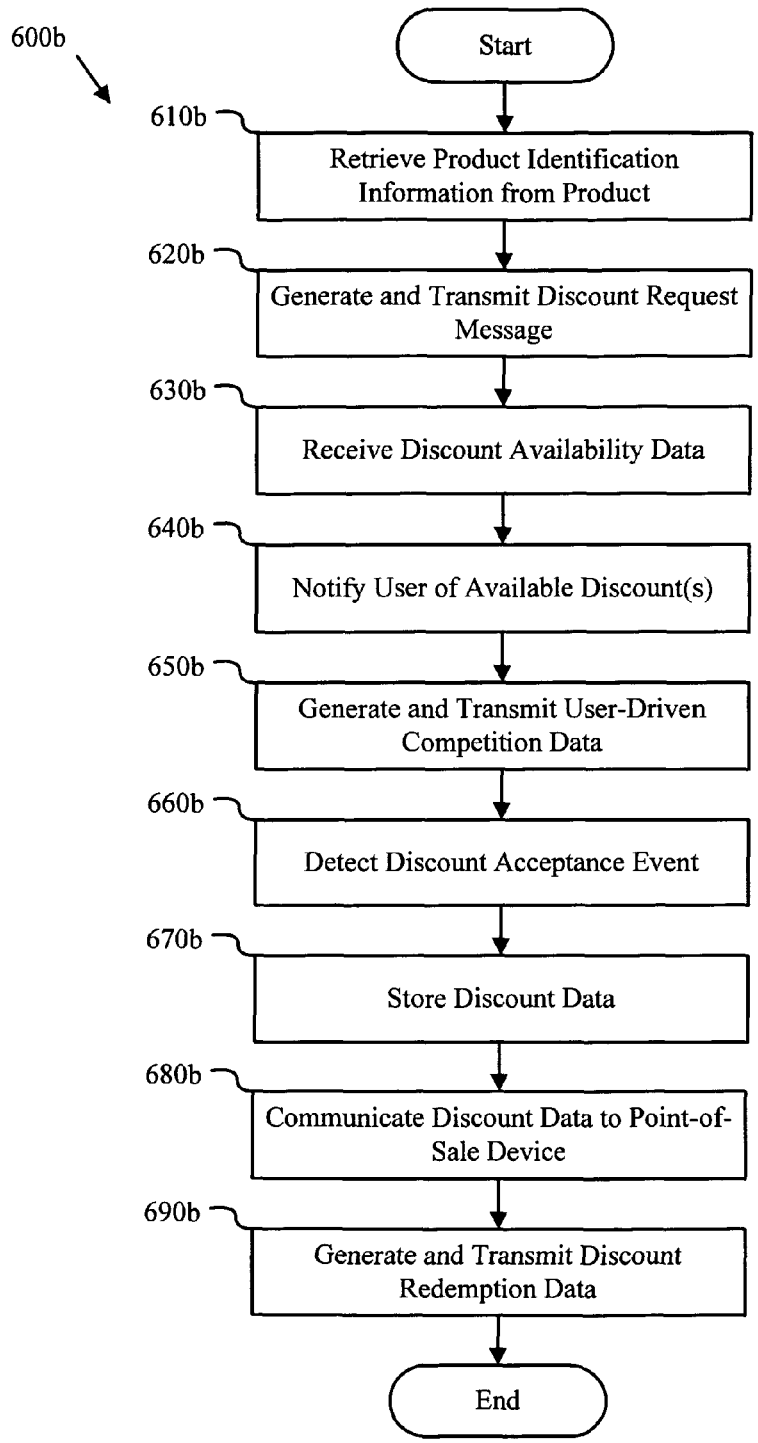
FIG. 6b is a flow chart diagram of another discount retrieval and redemption method in accordance with one or more embodiments of the present invention.

FIG. 6b is a flow chart diagram of another discount retrieval and redemption method 600b in accordance with one or more embodiments of the present invention. The depicted method 600b includes retrieving 610b product identification information from a product, generating 620b and transmitting a discount request message, receiving 630b discount availability data, notifying 640b a user of available discounts, generating 650b and transmitting user-driven competition data, detecting 660b a discount acceptance event, storing 670b discount data, communicating 680b discount data to a point-of-sale device, and generating 690b and transmitting discount redemption data. In certain embodiments, one or more of the operations of the method 600b may be performed, executed or otherwise correspond to the wireless device of FIG. 1 and FIG. 2 or one or more of the devices of wireless device of FIG. 4.

The depicted method 600b includes several operations that are depicted and described in connection with FIG. 6a. These operations include retrieving 610b product identification information from a product, generating 620b and transmitting a discount request message, receiving 630b discount availability data, and notifying 640b a user of available discounts. The description of these operations with respect to FIG. 6a are consistent with the method of FIG. 6b. Accordingly, reference is made to FIG. 6a with respect to these operations as a description thereof need not be repeated.

After notifying a user of one or more available discounts, the method 6b continues by generating 650 and transmitting user-driven competition data. Generating 650b and transmitting user-driven competition data may include producing a variety of data types and data combinations and communicating the data to a discount server. User-driven competition data may include any data that may enable or facilitate the creation of a user environment that incentivize or encourages users to compete with one another with respect to discovering and/or redeeming available product discounts. As such, the user-driven competition data may include a user ID, user-generated comments or reviews, a wireless device ID, product discount IDs, product IDs, discount amounts, discount percentages, a discount redemption time and date, geographic location information, and demographic information.

In the depicted method 600b, generating 650b and transmitting user-driven competition data is subsequent to notifying 640b a user of available discounts and precedes detecting 660b a discount acceptance event. While this sequence of operations is consistent with at least some embodiments, of the present invention, it should be appreciated that generating 650b and transmitting user-driven competition data can also be performed or executed at a different sequential point within the method 600b. For instance, in certain embodiments, generating 650b and transmitting user-driven competition data is performed before receiving 630b the discount availability data. In other embodiments, generating 650b and transmitting user-driven competition data is performed after detecting 660b a discount acceptance event. In still other embodiments, generating 650b and transmitting user-driven competition data is performed concurrently with generating 620b and transmitting a discount request message.

Detecting 660b a discount acceptance event may include a variety of user-initiated occurrences such as the user selecting one or more available discounts represented on a touch-sensitive screen, highlighting an available discount and pressing the "Enter" button, giving a verbal command detected by a microphone, and more. While not depicted, certain embodiments the method 6b may include an operation such as detecting a discount rejection event, which may involve a similar variety of user-initiated occurrences as detecting 650b a discount acceptance event.

Storing 670b discount data may include storing discount data corresponding to the discount acceptance event. The discount data may include any information useful or required to identify and redeem a product discount. Examples of discount data include, but are not limited to, a discount ID, a product ID, an SKU, an alphanumeric code, a discount amount, a discount percentage, a product title, and barcode information. Storing 660b discount data of an accepted discount can provide the benefit of enabling a user to continue shopping or searching for available discounts while preserving already-accepted discounts for checkout.

Communicating 680b discount data to a point-of-sale device may comprise several distinct operations or series of operations depending on the embodiment and/or scenario. In certain embodiments, communicating 660b discount data to a point-of-sale device may include displaying a product discount barcode that can be scanned into the point-of-sale device. In some embodiments, communicating 660b discount data to a point-of-sale device may include generating and transmitting a print command to a stand-alone printer or printing mechanism. In certain embodiments, communicating 680b discount data to a point-of-sale device may include establishing either a physical or wireless connection with the point-of-sale device and transmitting some or all of the discount data to the point-of-sale device.

In other embodiments, communicating 680b discount data to a point-of-sale device may include communicating discount data to the point-of-sale device via a discount server. If the customer is not currently involved in a checkout procedure, the point-of-sale device may associate the relevant product discounts with a customer loyalty device. However, if the customer is currently involved in a checkout procedure, the point-of-sale device may reduce the final cost by an amount consistent with the product discounts submitted by the user.

Generating 690b and transmitting discount redemption data may comprise producing information regarding recently redeemed discounts and communicating the information to a discount server. The discount redemption data may include any type or combination of data that would enable the discount server to accurately record the redeemed discounts. For instance, the discount redemption data may include a user ID, user-generated comments or reviews, a wireless device ID, product discount IDs, product IDs, discount amounts, discount percentages, a discount redemption time and date, geographic location information, and demographic information. In certain embodiments, recording redeemed discounts may enable the discount server to perform a variety of services such as tracking usage, estimating potential consumer bases, and facilitating reimbursements between manufacturers and retailers.

Figure 7:
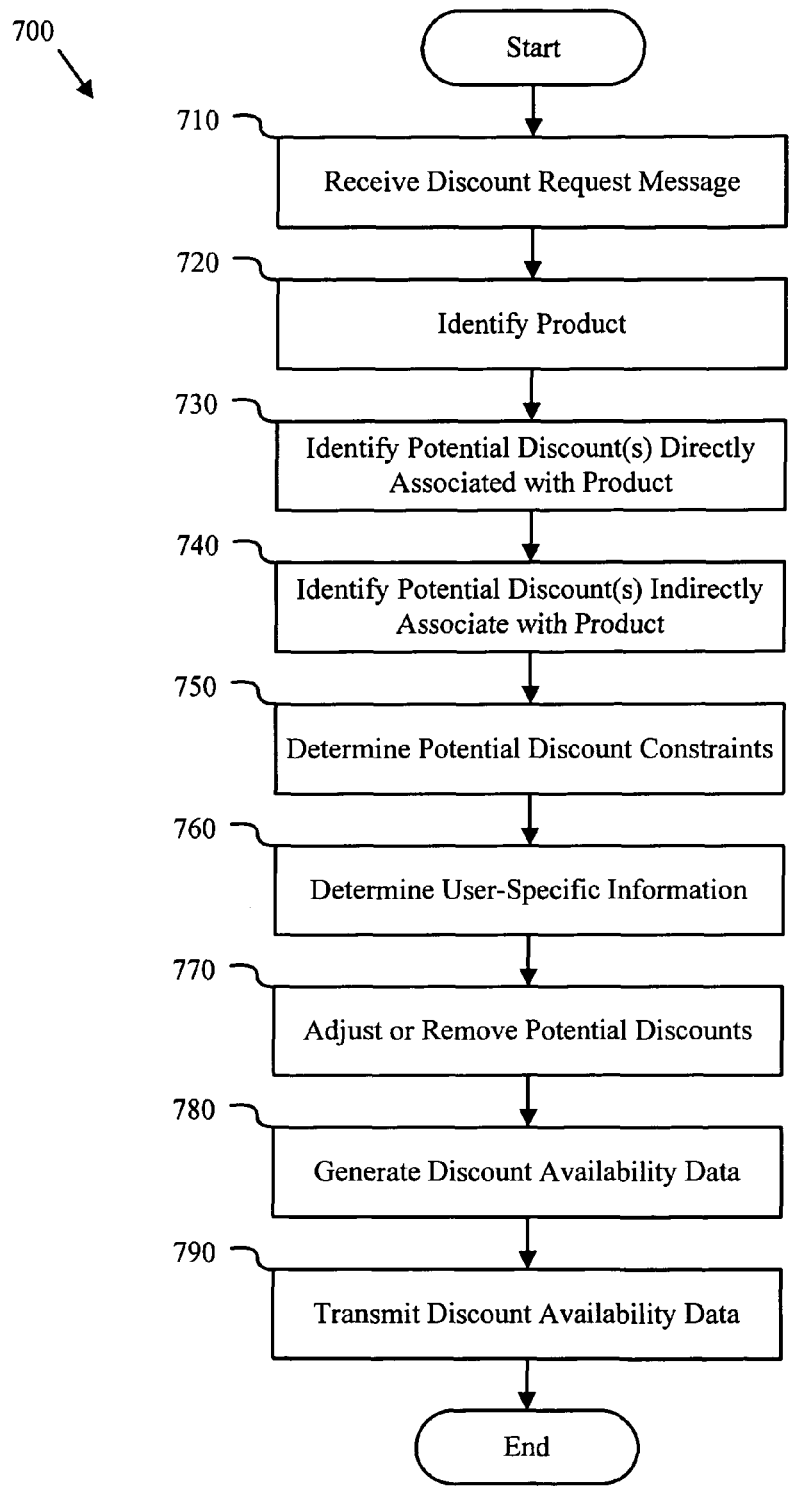
FIG. 7 is a flow chart diagram of a discount data retrieval method in accordance with one or more embodiments of the present invention.
Figure 8:
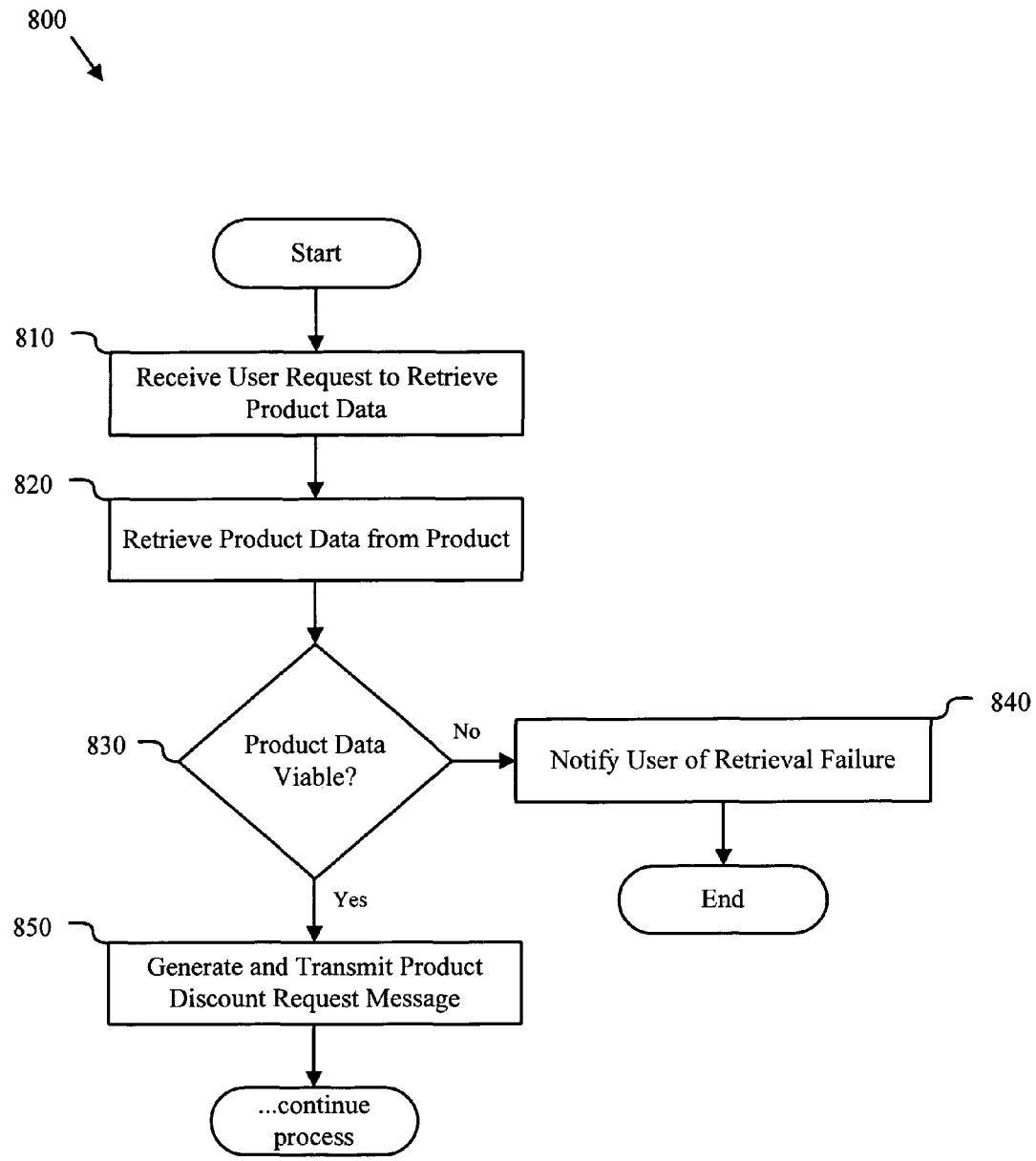
FIGS. 8-11 are flow chart diagrams of a discount redemption method in accordance with one or more embodiments of the present invention.
Figure 9:
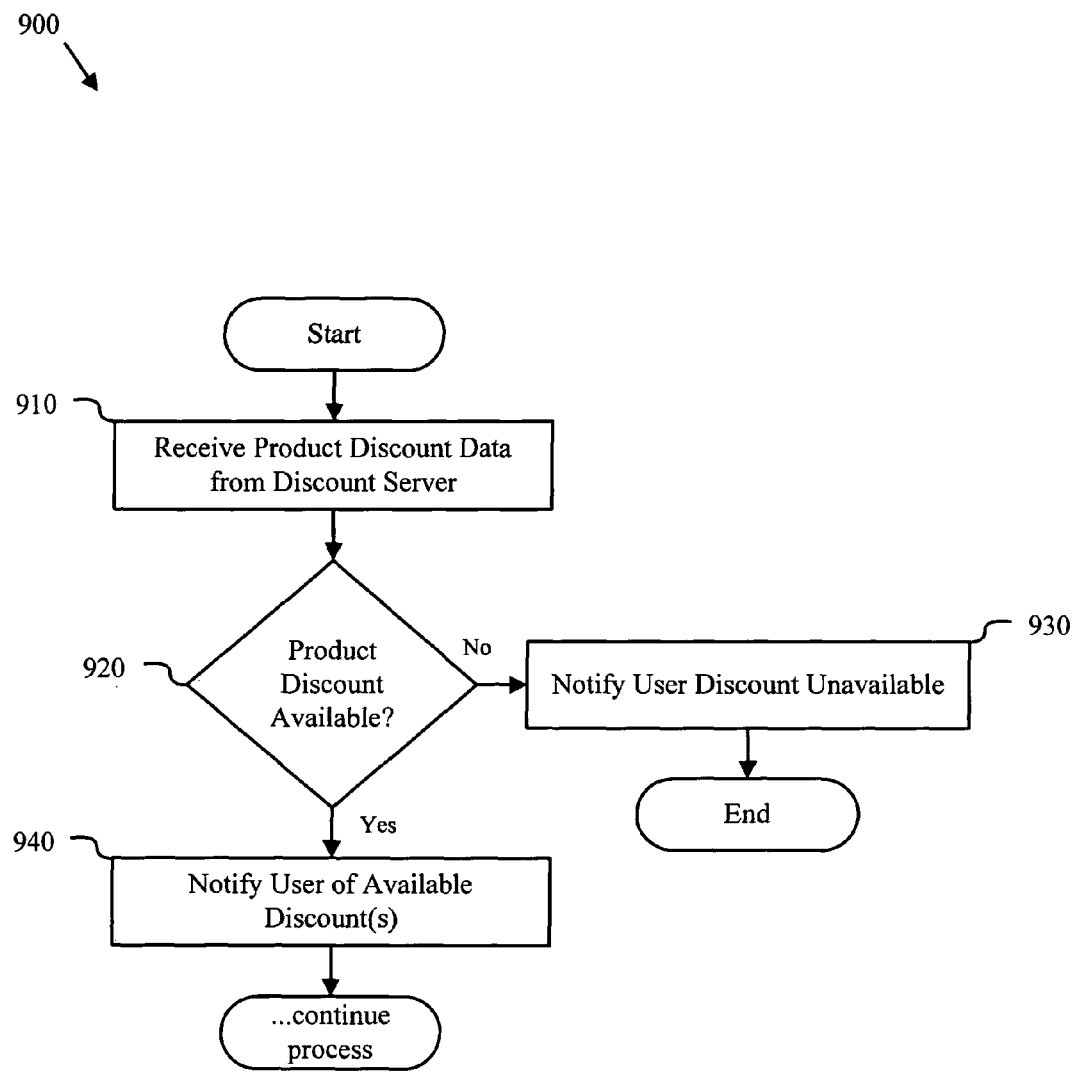
Figure 10:
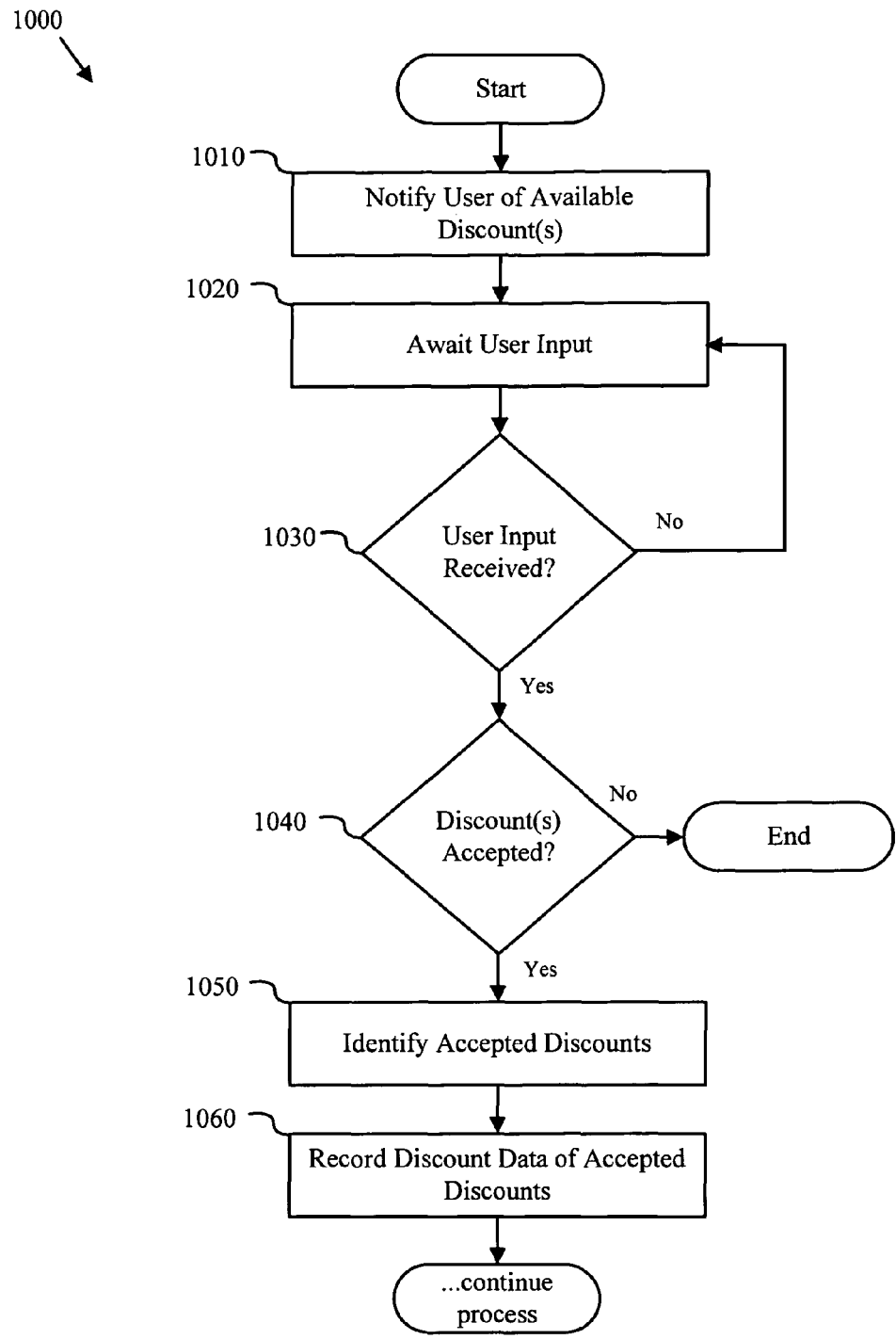
Figure 11:
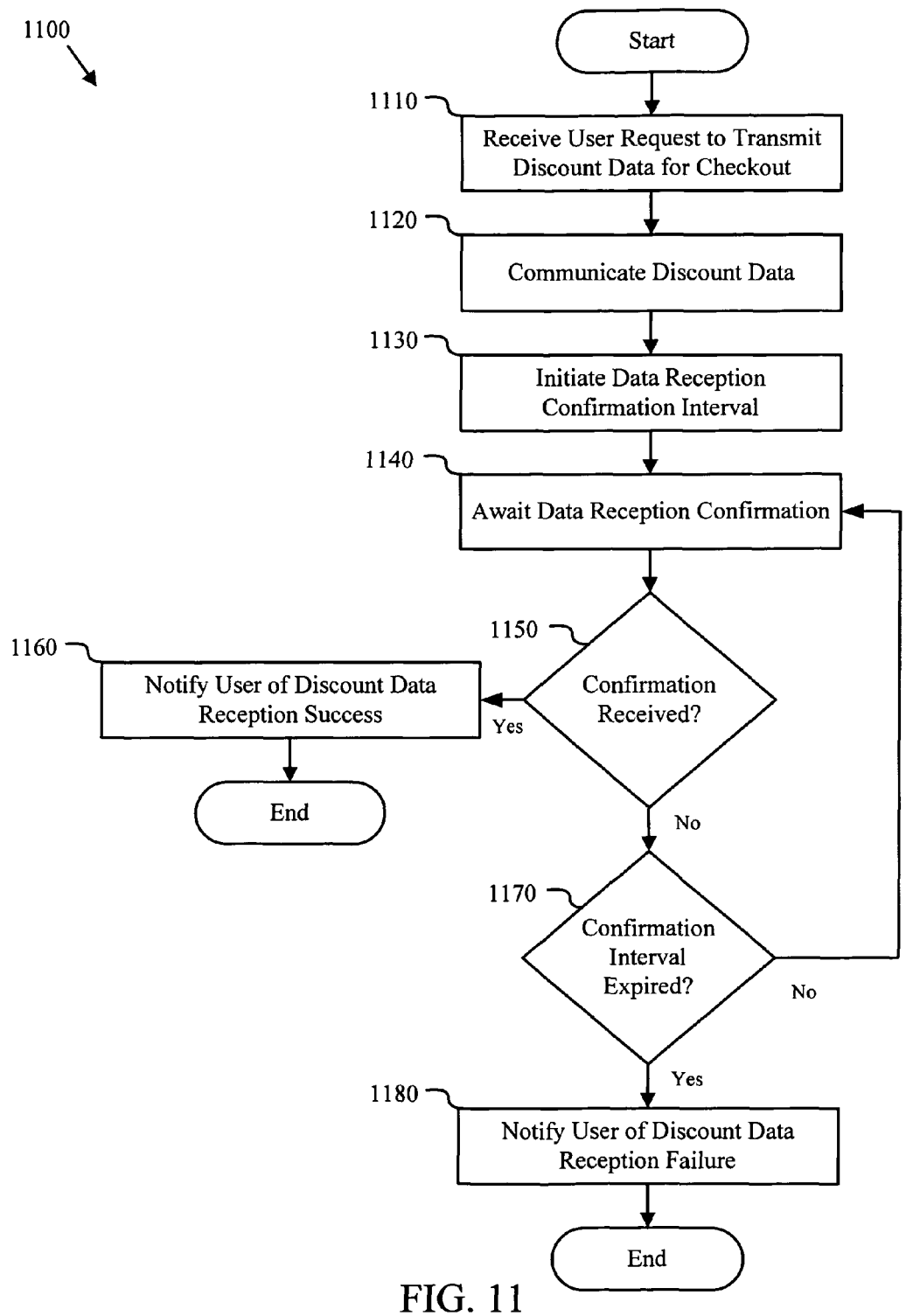

FIG. 7 is a flow chart diagram of a discount data retrieval method 700 in accordance with one or more embodiments of the present invention. The depicted method 700 includes receiving 710 a discount request message, identifying 720 a product, identifying 730 potential discounts directly associated with the product, identify 740 potential discounts indirectly associated with the product, determining 750 potential discount constrains, determining 760 user-specific information, adjusting 770 or disqualifying potential discounts, generating 780 discount availability data, and transmitting 790 the discount availability data. In certain embodiments, one or more of the operations of the method 700 may be performed, executed or otherwise correspond to the discount server of FIG. 1 and FIG. 2 or one or more of the discount server devices of FIG. 3.

Receiving 710 a discount request message may comprise a discount server receiving 710a a discount request message from a wireless device. In certain embodiments, the discount request message includes product identification information. In other embodiments, the discount request message includes user-specific information, such as geographical location information, user demographic information, user preferences, and/or user-driven competition data. In some embodiments, receiving 710 a discount request message comprises analyzing the discount request message, identifying user-specific information, and storing the user-specific information in a volatile memory and/or a nonvolatile memory.

Identifying 720 a product may include a discount server accessing one or more product discount databases configured to store product and product discount information. In certain embodiments, identifying 730 a product may include analyzing the product identification information in the discount request message and identifying one or more products based on the product identification. As discussed above, product identification information may be embodied by a variety of data types and compilations, including barcode information, multi-dimensional barcode information, a product label, a product title, an alphanumeric code, an RFID tag, and an SKU. As such, identifying 730 a product may include one or more operations for analyzing the product identification information for each possible data type.

Identifying 730 potential discounts directly associated with a product may comprise accessing one or more product discount databases to identify discounts that have been expressly and/or intentionally associated with the identified product. In some embodiments, the product is only directly associated with one potential discount. In other embodiments, the product is directly associated with multiple potential discounts. In still other embodiments, the product is directly associated with potential discounts for other products. Examples of these other products may include, but are not limited to cross-promotional products or products produced or sold by the same organization as the previously identified product. In certain embodiments, a cross-promotional product may include any product that is designed or intended to be promoted by the sale or offer for sale of another product (i.e., a cross-promotional product of peanut butter could be jelly). Identifying 730 potential discounts directly associated with a product may also comprise temporarily storing information corresponding to the directly related discounts.

Similar to identifying 730 directly related discounts, identifying 730 potential discounts indirectly associated with a product may comprise accessing one or more product discount databases to identify discounts that were not expressly, intentionally, and/or initially associated with the identified product. In certain embodiments, the product may only be indirectly associated with a single potential discount. In other embodiments, the product may be indirectly associated with multiple potential discounts. In yet other embodiments, the product may be indirectly associated with potential discounts for other products. Examples of such products may include substitute products or competitive products. Also, similar to identifying 730 directly related discounts, identifying 730 potential discounts indirectly associated with a product may comprise temporarily storing information corresponding to the indirectly related discounts.

Determining 750 potential discount constraints may include accessing a product discount database where a potential discount is stored and ascertaining where there are any required conditions placed on the potential discount. In certain embodiments, such a constraint or condition may include a geographical location of the user or the user pertaining to a preselected demographic. In certain embodiments, the potential discount constraints may be temporarily stored along with the potential discounts.

Determining 750 user-specific information may include identifying any information corresponding to the user and relating to the potential discounts and/or the previously determined discount constraints. As mentioned above, user-specific information may include user preferences, geographic location information, user demographic information, and more. Additionally, user-specific information may be included in the discount request message previously received. As such, in embodiments where user-specific information was previously stored as part of the receiving 710 of the discount request message, determining 750 user-specific information may comprise of retrieving the user-specific information from volatile or nonvolatile memory. However, in embodiments where user-specific information is not stored as part of the receiving 710 of the discount request message, determining 750 user-specific information may include analyzing the discount request message, identifying user-specific information, and storing the user-specific information in a volatile memory and/or a nonvolatile memory.

Adjusting 760 or removing potential discounts may include modifying or deleting one or more of the potential discounts previously identified. In certain embodiments, adjusting 760 or removing potential discounts may be based on an analysis or comparison of the potential discount, the potential discount constraints, and the user-specific information. For example, if the user-specific information indicates that a user is outside of a geographic location that is a requisite condition for a potential discount to become available, then the potential discount may be removed from the aggregate of potential discounts. Additionally, if the user-specific information indicates that a user is not part of a demographic that is required by the potential discount, then the potential discount may also be removed from the aggregate of potential discounts. Further, if the user-specific information indicates a user preference to exclude the products of one or more sellers or product discounts below a discount amount threshold, then the corresponding potential discount may be removed from the aggregate of potential discounts.

Generating 770 discount availability data may include compiling data corresponding to each of the potential discounts still remaining in the aggregate of potential discounts. As mentioned above, discount availability data may include one or more discount IDs, product IDs, barcodes, SKUs, product titles, product images, discount amounts, geographic location data, discount duration information, product price comparisons, and more. In certain embodiments, the discount availability data generated comprises the data necessary to accurately notify a user of an available discount, enable the user to redeem the available discount, and enable the user's wireless device to generate and transmit the requisite discount redemption data. Once the discount availability data have been generated 770, the method 700 terminates by transmitting 790 the discount availability data to a wireless device.

FIGS. 8-11 illustrate a method for receiving and redeeming an available discount in accordance with one or more embodiments of the present invention. A description of the method is provided below; however, it should be noted that some of the operations presented in the method have been described above in detail. In certain embodiments, one or more of the operations of the methods of FIGS. 8-11 may be performed, executed or otherwise correspond to the wireless device of FIG. 1 and FIG. 2 or one or more of the devices of the wireless device of FIG. 3.

The method includes receiving 810 a user request to retrieve product identification information. A user request may include application activation, turning on a product information reception device, positioning the device in a certain fashion, depressing a button, interacting with a graphical user interface and/or activating a location identification device. After receiving 810 the user request to retrieve product identification information, product identification information is retrieved 820 from the product. If the product identification information is viable 830, a product discount request message is generated 850. The product discount request message may include product identification information retrieved from the product. On the other hand, if the product data is not viable, the user is notified 840 of a retrieval failure. For example, if a barcode cannot be recognized, an image cannot be processed, or a video or camera feed is not complete, the user may be notified. In certain embodiments, the user is prompted to retry product data retrieval after a period of time has elapsed.

After the product discount request message has been generated 850 and transmitted, product discount data may be received 910 from the discount server. If a product discount is available 920, the user may be notified of the available discount 940. However, if there are no available discounts, the user may be notified 930 accordingly.

The user notification may include information such as available discounts, general information about the product, price comparisons, user reviews and the like. The user may be presented with a list or limited discount information and the discounts may refer to products unrelated to the original product detected. In certain embodiments, the user may have the option to request additional information about a particular product or discount after viewing the initially received product discount data. In certain embodiments, user input is requested. For example, the user may have identified a discount during the shopping experience, or be able to enter the price of the product that the user may input in order to enhance the available discount database.

In certain embodiments, after the user has been notified 940 and 1010 of available discounts, the wireless device executing the method may wait 1020 for user input. For example, the user may choose to discard or reject a discount, request further information, or enter additional parameters. The user input 1030 may indicate that the available discount has been accepted 1040. In certain embodiments, an available discount may be accepted 1040 without user input.

After the available discount has been accepted, the accepted discount may be identified 1050 and the discount data of accepted discounts may be recorded 1060. In certain embodiments, recording discount data of accepted discounts includes adding one or more discounts to local storage, or adding the discount to a list, string, array, database, or the like. In certain embodiments, the recorded discount data of accepted discounts is also transmitted to a remote device.

In certain embodiments, once the discount has been accepted, the user may wish to transmit the discount to the point-of-sale device or automatically receive the discount or credit. In such embodiments, a wireless device may receive 1110 a user request to transmit discount data for checkout. After the user request has been received 1110, the wireless device may communicate 1120 the discount data to a point-of-sale device. In certain embodiments, the wireless device may physically attach in order to communicate. In other embodiments, the wireless device may transmit a signal wirelessly that is intended to communicate 1120 the product discount data. In certain embodiments, the product discount data is relayed to a remote computing device.

A data reception confirmation interval may then be initiated 1130. For example, the wireless device may transmit information until a confirmation is received or until a certain period of time is elapsed. The wireless device may then await 1140 a data reception confirmation. If the confirmation is received 1150, the user is notified 1160 of discount data reception success. In certain embodiments, the user is issued a credit once the discount data has been successfully received. For example, the user may receive points, credits, rewards or the like. In certain embodiments, the user credit may be transmitted to a remote computing device. However, if the confirmation is not received and the confirmation interval has expired 1170, the user may be notified 1180 of discount data reception failure.

Figure 12:
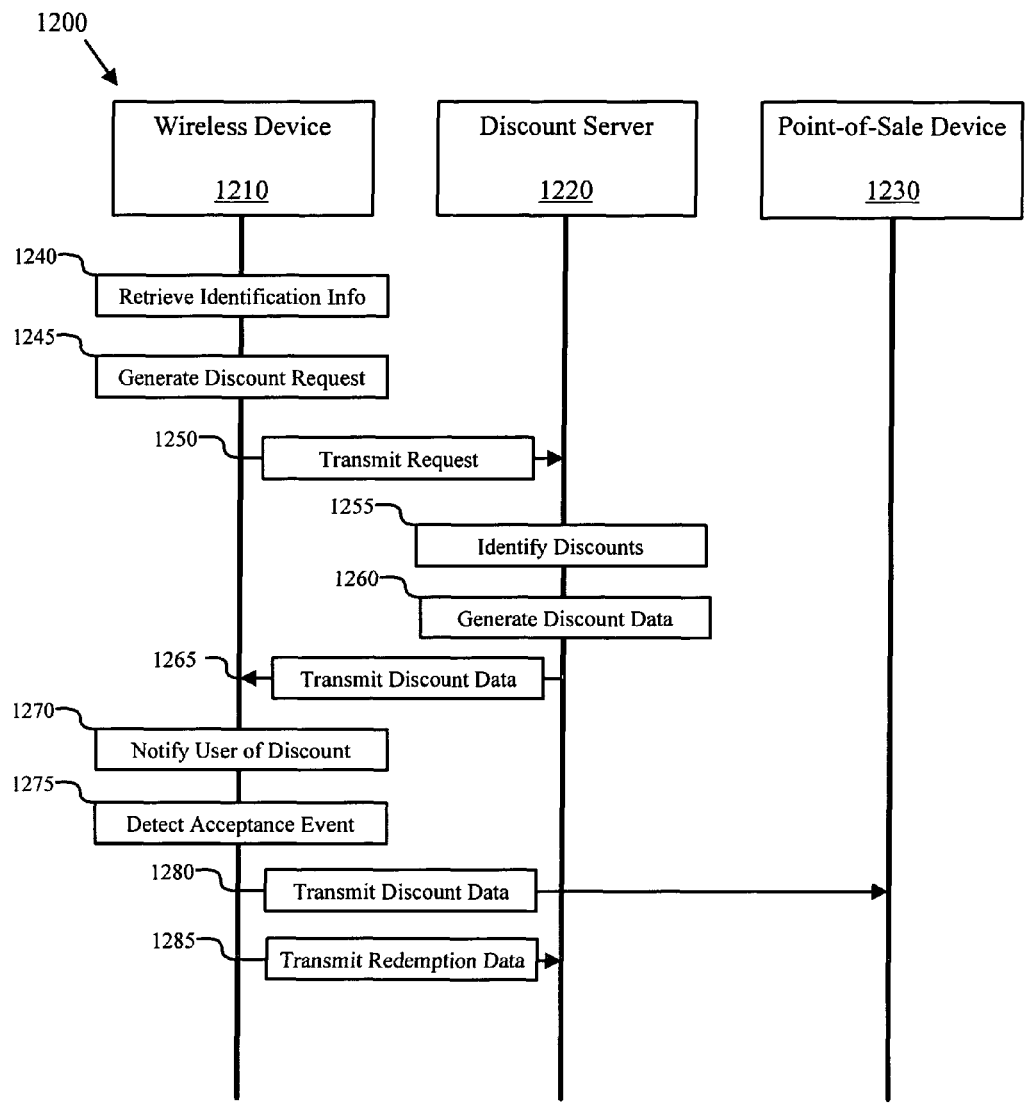
FIG. 12 is a sequence flow diagram of a product discount method in accordance with one or more embodiments of the present invention.

FIG. 12 is a sequence flow diagram of a product discount method 1200 in accordance with one or more embodiments of the present invention. The depicted method 1200 includes a wireless device 1210, a discount server 1220, and a point-of-sale device 1230. The device and operations depicted in the method 1200 may correspond to one or more devices or operations discussed above in any of FIGS. 1-11.

The method 1200 begins with the wireless device retrieving 1240 product identification information from one or more products. After retrieving 1240 the product identification information, the wireless device 1210 may proceed by generating 1245 a discount request message based on the product identification information and transmit 1250 the discount request message to the discount server 1220. The discount server 1220 may identify 1255 one or more potential discounts based on the product identification information contained in the discount request message. In certain embodiments, the discount server 1220 may perform several operations in identifying 1255 potential discounts (see FIG. 7, for example).

After identifying 1255 potential discounts, the discount server 1220 may proceed by generating 1260 discount availability data corresponding to the potential discounts. The discount server 1220 may then transmit the discount availability data to the wireless device 1210, and the wireless device 1210 may notify 1270 a user of available discounts. If the user decides to accept one or more of the available discounts, the wireless device 1210 may detect 1275 a discount acceptance event. In response to detecting 1275 the discount acceptance event, the wireless device 1210 may proceed by transmitting discount data corresponding to the discount acceptance event to the point-of-sale device 1230 and also transmitting 1285 discount redemption data to the discount server 1220.

One having ordinary skill in the art will readily understand that the invention as discussed above may be practiced with steps and/or operations in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The invention claimed is:

1. A method, comprising:
retrieving product identification information from at least one product using a wireless device operated by a user;
generating a discount request message using the wireless device, based on the product identification information and user-specific information;
transmitting the discount request message from the wireless device to a discount server via a wireless network;
receiving at the wireless device discount availability data from the discount server, wherein the discount availability data comprises one or more product discounts and at least one of geographic location data and discount duration information for at least one product discount, wherein at least one product discount is for a competing product to the product with the retrieved product identification information, and wherein the discount availability data is determined at least in part by disqualifying potential discounts based on user-specific information;
notifying the user of at least one available discount based on the discount availability data;
receiving acceptance by the user of the at least one available discount;
generating discount redemption data and user-driven competition data using the wireless device in response to receiving acceptance by the user of the at least one available discount;
transmitting the discount redemption data and the user-driven competition data from the wireless device to the discount server; and
estimating on the discount server a potential customer base for the at least one available discount, wherein estimating the potential customer base for the at least one available discount comprises determining the total number of potential customers based on discount request messages, discount redemption data, and user-driven competition data for similar product discounts to the at least one available discount and reducing the total number of potential customers based on market conditions associated with the at least one available discount being offered.

2. The method of claim 1, further comprising storing discount data corresponding to the accepted discount.

3. The method of claim 1, further comprising initiating an association between the at least one available discount and a customer loyalty device.

4. The method of claim 1, further comprising:
initiating a data reception confirmation interval;
notifying the user of a data reception success when a data reception confirmation is received prior to expiration of the data reception confirmation interval; and
notifying the user of a data reception failure when the data reception confirmation is not received prior to expiration of the data confirmation interval.

5. The method of claim 1, wherein the retrieving of the product identification information comprises activating at least one of a camera, a video camera, a barcode scanner, a radio frequency identification detector, a Bluetooth receiver, a light reflection detector, and a microphone.

6. A computer program embodied on one or more non-transitory computer-readable media and comprising code that when executed by a computer system, enables the computer system to perform the following method comprising:
retrieving product identification information from at least one product using a wireless device operated by a user;
generating a discount request message using the wireless device, based on the product identification information and user-specific information;
transmitting the discount request message from the wireless device to a discount server via a wireless network;
receiving at the wireless device discount availability data from the discount server, wherein the discount availability data comprises one or more product discounts and at least one of geographic location data and discount duration information for at least one product discount, wherein at least one product discount is for a competing product to the product with the retrieved product identification information, and wherein the discount availability data is determined at least in part by disqualifying potential discounts based on user-specific information;
notifying the user of at least one available discount based on the discount availability data;
receiving acceptance by the user of the at least one available discount;
generating discount redemption data and user-driven competition data using the wireless device in response to receiving acceptance by the user of the at least one available discount;
transmitting the discount redemption data and the user-driven competition data from the wireless device to the discount server; and
estimating on the discount server a potential customer base for the at least one available discount, wherein estimating the potential customer base for the at least one available discount comprises determining the total number of potential customers based on discount request messages, discount redemption data, and user-driven competition data for similar product discounts to the at least one available discount and reducing the total number of potential customers based on market conditions associated with the at least one available discount being offered.

7. A system, comprising:
a central discount server; and
a wireless device, wherein
the wireless device is configured to retrieve product identification information from at least one product, generate a discount request message based at least in part on the product identification information and user-specific information, and transmit the discount request message to the central discount server,
the central discount server is configured to receive the discount request message, identify at least one potential discount based on product identification information, generate discount availability data corresponding to the at least one potential discount, wherein the discount availability data is determined at least in part by disqualifying potential discounts based on user-specific information, and transmit the discount availability data to the wireless device,
the wireless device is further configured to receive the discount availability data from the central discount server, notify a user of the at least one available discount based on the discount availability data, receive acceptance by the user of the at least one available discount, generate discount redemption data and user-driven competition data in response to receiving acceptance by the user of the at least one available discount, and transmit the discount redemption data and the user-driven competition data to the central discount server, and
the central discount server is further configured to estimate a potential customer base for the at least one available discount, wherein estimating the potential customer base for the at least one available discount comprises determining the total number of potential customers based on discount request messages, discount redemption data, and user-driven competition data for similar product discounts to the at least one available discount and reducing the total number of potential customers based on market conditions associated with the at least one available discount being offered.

8. A method, comprising:
retrieving product identification information from at least one product using a wireless device operated by a user;
generating a discount request message using the wireless device, based on the product identification information;
transmitting the discount request message from the wireless device to a discount server via a wireless network;
receiving at the wireless device discount availability data from the discount server, wherein the discount availability data is determined at least in part by comparing one or more potential discounts with one or more potential discount constraints and user-specific information, wherein comparing the one or more potential discounts with the one or more potential discount constraints and user-specific information comprises identifying one or more requisite conditions that must be satisfied for the one or more potential discounts to be made available to the user and wherein in response to the one or more requisite conditions not being satisfied, disqualifying the one or more potential discounts from the discount availability data, and wherein the potential discount constraints are determined at least in part by discount redemption data;
notifying the user of at least one available discount based on the discount availability data;
receiving acceptance by the user of the at least one available discount;
generating discount redemption data and user-driven competition data using the wireless device in response to receiving acceptance by the user of the at least one available discount;
transmitting the discount redemption data and the user-driven competition data from the wireless device to the discount server; and
estimating on the discount server a potential customer base for the at least one available discount, wherein estimating the potential customer base for the at least one available discount comprises determining the total number of potential customers based on discount request messages, discount redemption data, and user-driven competition data for similar product discounts to the at least one available discount and reducing the total number of potential customers based on market conditions associated with the at least one available discount being offered.

9. The method of claim 8, further comprising storing discount data corresponding to the accepted discount.

10. The method of claim 8, further comprising initiating an association between the at least one available discount and a customer loyalty device.

11. The method of claim 8, further comprising:
initiating a data reception confirmation interval;
notifying the user of a data reception success when a data reception confirmation is received prior to expiration of the data reception confirmation interval; and
notifying the user of a data reception failure when the data reception confirmation is not received prior to expiration of the data confirmation interval.

12. The method of claim 8, wherein the retrieving of the product identification information comprises activating at least one of a camera, a video camera, a barcode scanner, a radio frequency identification detector, a Bluetooth receiver, a light reflection detector, and a microphone.

13. The method of claim 8, wherein the generating of the discount request message is also based on user-specific information.

14. A computer program embodied on one or more non-transitory computer-readable media and comprising code that when executed by a computer system, enables the computer system to perform the following method comprising:
retrieving product identification information from at least one product using a wireless device operated by a user;
generating a discount request message using the wireless device, based on the product identification information;
transmitting the discount request message from the wireless device to a discount server via a wireless network;
receiving at the wireless device discount availability data from the discount server, wherein the discount availability data is determined at least in part by comparing one or more potential discounts with one or more potential discount constraints and user-specific information, wherein comparing the one or more potential discounts with the one or more potential discount constraints and user-specific information comprises identifying one or more requisite conditions that must be satisfied for the one or more potential discounts to be made available to the user and wherein in response to the one or more requisite conditions not being satisfied, disqualifying the one or more potential discounts from the discount availability data, and wherein the potential discount constraints are determined at least in part by discount redemption data;
notifying the user of at least one available discount based on the discount availability data;
receiving acceptance by the user of the at least one available discount;
generating discount redemption data and user-driven competition data using the wireless device in response to receiving acceptance by the user of the at least one available discount;
transmitting the discount redemption data and the user-driven competition data from the wireless device to the discount server; and
estimating on the discount server a potential customer base for the at least one available discount, wherein estimating the potential customer base for the at least one available discount comprises determining the total number of potential customers based on discount request messages, discount redemption data, and user-driven competition data for similar product discounts to the at least one available discount and reducing the total number of potential customers based on market conditions associated with the at least one available discount being offered.

* * * * *